United States Patent
Allmen et al.

(10) Patent No.: US 6,738,424 B1
(45) Date of Patent: May 18, 2004

(54) SCENE MODEL GENERATION FROM VIDEO FOR USE IN VIDEO PROCESSING

(75) Inventors: Mark Allmen, Morrison, CO (US); Chris Debrunner, Conifer, CO (US); William Severson, Littleton, CO (US); Thomas M. Strat, Oakton, VA (US)

(73) Assignee: ObjectVideo, Inc., Reston, VA (US)

( * ) Notice: Subject to any disclaimer, the term of this patent is extended or adjusted under 35 U.S.C. 154(b) by 742 days.

(21) Appl. No.: 09/609,919

(22) Filed: Jul. 3, 2000

Related U.S. Application Data

(63) Continuation-in-part of application No. 09/472,162, filed on Dec. 27, 1999.

(51) Int. Cl.[7] .................................................. H04N 7/12
(52) U.S. Cl. .................................... 375/240.08; 382/154
(58) Field of Search ....................... 375/240.01, 240.08; 382/154

(56) References Cited

U.S. PATENT DOCUMENTS

| | | | |
|---|---|---|---|
| 4,525,858 A | 6/1985 | Cline et al. | |
| 4,928,252 A | 5/1990 | Gabbe et al. | ............... 364/519 |
| 5,034,986 A | 7/1991 | Karmann et al. | ............... 382/1 |
| 5,040,067 A | 8/1991 | Yamazaki | ................... 358/183 |
| 5,187,754 A | 2/1993 | Currin et al. | ................. 382/54 |
| 5,258,837 A | 11/1993 | Gormley | ..................... 358/140 |
| 5,325,449 A | 6/1994 | Burt et al. | ..................... 382/56 |
| 5,339,104 A | 8/1994 | Hong et al. | ................. 348/155 |
| 5,363,476 A | 11/1994 | Kurashige et al. | |
| 5,410,644 A | 4/1995 | Thier et al. | |
| 5,412,436 A | 5/1995 | Christopher | |
| 5,416,606 A | 5/1995 | Katayama et al. | .......... 358/467 |
| 5,475,431 A | 12/1995 | Tsukagoshi | |
| 5,559,334 A | 9/1996 | Gupta et al. | |
| 5,633,683 A | 5/1997 | Rosengren et al. | ........ 348/385 |
| 5,642,166 A | 6/1997 | Shin et al. | |
| 5,649,032 A | 7/1997 | Burt et al. | |
| 5,686,956 A | 11/1997 | Oh et al. | |
| 5,692,063 A | 11/1997 | Lee et al. | |
| 5,699,129 A | 12/1997 | Tayama | |
| 5,703,651 A | 12/1997 | Kim et al. | |
| 5,706,367 A | 1/1998 | Kondo et al. | |
| 5,715,005 A | 2/1998 | Masaki | |
| 5,719,628 A | 2/1998 | Ohki | |

FOREIGN PATENT DOCUMENTS

| | | |
|---|---|---|
| EP | 0632662 | 1/1995 |
| EP | 0639925 | 2/1995 |
| EP | 0797181 | 9/1997 |

OTHER PUBLICATIONS

Zakhor et al., "3D Camera Motion Estimation with Applications to Video Compression and 3D Scene Reconstruction", Image and Video Processing, vol. 1903, pp. 2–15, 1993.

Website: www.Sarnoff.com/career_move/tech_papers/visiontechlab.htm (Jun. 22, 2000).

Tannenbaum et al., "Evaluation of a Mosaic–Based Approach to Video Compression", David Sarnoff Research Center, Princeton, NJ.

Sawhney et al., "True Multi–Image Alignment and its Application to Mosaicing and Lens Distortion Correction", Sarnoff Corporation.

(List continued on next page.)

*Primary Examiner*—Chris Kelley
*Assistant Examiner*—David Czekaj
(74) *Attorney, Agent, or Firm*—Venable; Cliff McCann; Jeffri A. Kaminski

(57) ABSTRACT

A method of generating and utilizing a scene model from a sequence of video frames produces a three-dimensional scene model, useful for video processing. The method separates foreground and background data. It uses an estimate of relative motion of an observer to project each frame onto a coordinate system of the three-dimensional scene model. It then merges the background data of a given frame into the scene model.

82 Claims, 11 Drawing Sheets

OTHER PUBLICATIONS

Sawhney et al., "*Robust Video Mosaicing through Topology Inference and Local to Global Alignment*", European Conference on Vision Tech. (1998).

Sawhney et al., "*Model–based 2D&3D Dominant Motion Estimation for Mosaicing and Video Representation*", Dec. 1, 1994.

Hsu et al., "*Hierarchical Representations for Mosaic Based Video Compression*", David Sarnoff Research Center, Princeton, NJ.

Sawhney et al., "*VideoBrush: Experiences with Consumer Video Mosaicing*", Sarnoff Corporation, Princeton, NJ.

Michael Irani, "*Isolating Multiple 2D Image Motions for Image Enhancement and for 3D Motion Analysis*", Scientific Council of the Hebrew University of Jerusalem.

Burt et al., "*Enhanced Image Capture Through Fusion*", David Sarnoff Research Center, Princeton, NJ (1993).

Burt et al., "*Merging Images Through Pattern Decomposition*", vol. 575 Applications for Digital Image Processing VIII (1985).

Burt et al., "*A Multiresolution Spline with Application to Image Mosaics*", ACM Transactions on Graphics, vol. 2, No. 4 (Oct. 1983).

Bove, Jr., et al., "*Real–Time Decoding and Display of Structured Video*", Proc. IEEE ICMS (1994).

Li et al., "*Image Sequence Coding at Very Low Bitrates: A Review*", IEEE Transactions on Image Processing, vol. 3, No. 5 (Sep. 1994).

Patrick Campbell McLean, *Structured Video Coding*, Massachusetts Institute of Technology (Jun. 1991).

SCENE MODEL GENERATION FROM VIDEO FOR USE IN VIDEO PROCESSING

RELATED APPLICATION DATA

The present application is a continuation-in-part of Ser. No. 09/472,162, entitled "Method, Apparatus, and System for Compressing/Decompressing Digital Video Data," filed on Dec. 27, 1999, and incorporated herein by reference.

BACKGROUND OF THE INVENTION

1. Field of the Invention

The present invention relates generally to systems for processing digital video data, and more particularly to a method by which video background data can be modeled for use in video processing applications.

2. Description of the Related Art

Full-motion video displays based upon analog video signals have long been available in the form of television. With recent increases in computer processing capabilities and affordability, full motion video displays based upon digital video signals are becoming more widely available. Digital video systems can provide significant improvements over conventional analog video systems in creating, modifying, transmitting, storing, and playing full-motion video sequences.

Digital video displays involve large numbers of image frames that are played or rendered successively at frequencies of between 10 and 60 frames per second. Each image frame is a still image formed from an array of pixels according to the display resolution of a particular system. As examples, NTSC-based systems have display resolutions of 720×486 pixels, and high-definition television (HDTV) systems under development have display resolutions of 1920× 1080 pixels.

The amounts of raw digital information included in video sequences are massive. Storage and transmission of these amounts of video information is infeasible with conventional personal computer equipment. With reference to a digitized form of a digitized NTSC image format having a 720×486 pixel resolution, a full-length motion picture of two hours in duration could correspond to 113 gigabytes of digital video information. By comparison, conventional compact optical disks have capacities of about 0.6 gigabytes, magnetic hard disks have capacities of 10–20 gigabytes, and compact optical disks under development have capacities of up to 8 gigabytes.

In response to the limitations in storing or transmitting such massive amounts of digital video information, various video compression standards or processes have been established, including the Motion Picture Expert Group standards (e.g., MPEG-1, MPEG-2, MPEG-4, and H.26X). The conventional video compression techniques utilize similarities within image frames, referred to as spatial or intraframe correlation, to provide intraframe compression in which the motion representations within an image frame are further compressed. Intraframe compression is based upon conventional processes for compressing still images, such as discrete cosine transform (DCT) encoding. In addition, these conventional video compression techniques utilize similarities between successive image frames, referred to as temporal or interframe correlation, to provide interframe compression in which pixel-based representations of image frames are converted to motion representations.

Although differing in specific implementations, the MPEG-1, MPEG-2, and H.26X video compression standards are similar in a number of respects. The following description of the MPEG-2 video compression standard is generally applicable to the others.

MPEG-2 provides interframe compression and intraframe compression based upon square blocks or arrays of pixels in video images. A video image is divided into transformation blocks having dimensions of 16×16 pixels. For each transformation block $T_N$ in an image frame N, a search is performed across the image of a next successive video frame N+1 or immediately preceding image frame N−1 (i.e., bidirectionally) to identify the most similar respective transformation blocks $T_{N+1}$ or $T_{N-1}$.

Ideally, and with reference to a search of the next successive image frame, the pixels in transformation blocks $T_N$ and $T_{N+1}$ are identical, even if the transformation blocks have different positions in their respective image frames. Under these circumstances, the pixel information in transformation block $T_{N+1}$ is redundant to that in transformation block $T_N$. Compression is achieved by substituting the positional translation between transformation blocks $T_N$ and $T_{N+1}$ for the pixel information in transformation block $T_{N+1}$. In this simplified example, a single translational vector ($\Delta X$, $\Delta Y$) is designated for the video information associated with the 256 pixels in transformation block $T_{N-1}$.

Frequently, the video information (i.e., pixels) in the corresponding transformation blocks $T_N$ and $T_{N-1}$ are not identical. The difference between them is designated a transformation block error E, which often is significant. Although it is compressed by a conventional compression process such as discrete cosine transform (DCT) encoding, the transformation block error E is cumbersome and limits the extent (ratio) and the accuracy by which video signals can be compressed.

Large transformation block errors E arise in block-based video compression methods for several reasons. The block-based motion estimation represents only translational motion between successive image frames. The only change between corresponding transformation blocks $T_N$ and $T_{N+1}$ that can be represented are changes in the relative positions of the transformation blocks. A disadvantage of such representations is that full-motion video sequences frequently include complex motions other than translation, such as rotation, magnification, and shear. Representing such complex motions with simple translational approximations result in the significant errors.

Another aspect of video displays is that they typically include multiple image features or objects that change or move relative to each other. Objects may be distinct characters, articles, or scenery within a video display. With respect to a scene in a motion picture, for example, each of the characters (i.e., actors) and articles (i.e., props) in the scene could be a different object.

The relative motion between objects in a video sequence is another source of significant transformation block errors E in conventional video compression processes. Due to the regular configuration and size of the transformation blocks, many of them encompass portions of different objects. Relative motion between the objects during successive image frames can result in extremely low correlation (i.e., high transformation errors E) between corresponding transformation blocks. Similarly, the appearance of portions of objects in successive image frames (e.g., when a character turns) also introduces high transformation errors E.

Conventional video compression methods appear to be inherently limited due to the size of transformation errors E. With the increased demand for digital video storage, transmission, and display capabilities, improved digital video compression processes are required.

Motion estimation plays an important role in video compression, multimedia applications, digital video archiving, video browsing, and video transmission. It is well known in the art that in video scenes, there exists a high temporal (i.e., time based) correlation between consecutive video image frames. The bit rate for compressing the video scene can be reduced significantly if this temporal correlation is used to estimate the motion between consecutive video image frames.

For example, in block based video compression schemes such as MPEG-1 and MPEG-2, block matching is used to take advantage of temporal correlation. Each of consecutive video image frames is divided into multiple blocks of pixels referred to as pixel blocks. Corresponding pixel blocks are identified in consecutive video image frames, motion transformations between the corresponding pixel blocks are determined, and difference between the transformed pixel blocks represent error signals.

MPEG-4 describes a format for representing video in terms of objects and backgrounds, but stops short of specifying how the background and foreground objects are to be obtained from the source video. An MPEG-4 visual scene may consist of one or more video objects. Each video object is characterized by temporal and spatial information in the form of shape, motion, and texture.

FIG. 5 illustrates a general block diagram for MPEG-4 encoding and decoding based on the notion of video objects (T. Ebrahimi and C. Horne, "MPEG-4 Natural Video Coding. An Overview"). Each video object is coded separately. For reasons of efficiency and backward compatibility, video objects are coded via their corresponding video object planes in a hybrid coding scheme somewhat similar to previous MPEG standards.

FIG. 6 illustrates a process for decoding MPEG-4 video bit streams. Each video object is decoded separately in terms of its shape, motion, and image texture. The decoder produces video object planes (VOPs) corresponding to each frame of the video object, which are then reassembled by the compositor before being output from the decoder as complete videoframes.

Several patents are illustrative of well-known technology for video compression. For example, in U.S. Pat. No. 5,475,431 issued on Dec. 12, 1995 to Ikuo Tsukagoshi describes a picture encoding apparatus wherein picture data is predictively transformed at every unit block into predictive encoding data. The encoding data is orthogonally transformed into coefficient data to be variable length coded, thereby outputting the picture data with high efficiency coding.

U.S. Pat. No. 5,642,166 issued on Jun. 24, 1997 to Jae-seob Shin et al. describes a bi-directional motion estimation method and apparatus in a low bit-rate moving video codec system, for filtering motion vectors by performing a bi-directional motion estimation in units of objects having the same motion in a constant domain and for compensating the motion using the motion vectors generated as the result of forward or backward motion prediction in accordance with the motion prediction mode of previously set frames, can determine the precise motion vector compared to the existing block matching algorithm and depict the inter-frame motion with a smaller amount of information. Therefore, markedly less data (for compression) is used and reconstructed picture quality is improved.

U.S. Pat. No. 5,686,956 issued on Nov. 11, 1997 to Seong-Jun Oh et al. describes an object based background information coding apparatus and method for an MPEG-4 system codes background images for effectively compressing image data corresponding to an MPEG-4 profile and for compensating the background information without errors.

The apparatus includes a first region extraction circuit for extracting a changed region using a motion vector obtained from a current input image and an image inputted after the current image; a second extraction circuit for extracting an uncovered region from the input image of the first region extraction circuit; an uncovered background extracting circuit for extracting uncovered background information from the changed region information extracted from the first region extraction circuit.

U.S. Pat. No. 5,692,063 issued on Nov. 25, 1997 to Ming-Chieh Lee et al. describes a video compression encoder process for compressing digitized video signals representing display motion in video sequences of multiple image frames. The encoder process utilizes object-based video compression to improve the accuracy and versatility of encoding interframe motion and intraframe image features. Video information is compressed relative to objects of arbitrary configurations, rather than fixed, regular arrays of pixels as in conventional video compression methods. This reduces the error components and thereby improves the compression efficiency and accuracy. As another benefit, it supports object-based video editing capabilities for processing compressed video information.

U.S. Pat. No. 5,699,129 issued on Dec. 16, 1997 to Masashi Tayama describes a multipass motion vector determination unit that first examines a search window area around each macroblock to select a first motion vector for each macroblock. The multipass motion vector determination unit then determines a second motion vector window for each macroblock based on the first motion vector found for that macroblock. Specifically, the second search window consists of an area located in the direction of the first motion vector. A second motion vector is selected from the second search window. The multipass motion vector determination unit then selects a final motion vector from the first motion vector and the second motion vector depending upon which motion vector has the smaller summation of absolute difference value.

U.S. Pat. No. 5,703,651 issued on Dec. 30, 1997 to Hyung Suk Kim et al. describes an MPEG video CODEC that includes a variable length decoder to a video coder with respect to an MPEG-2 profile. The MPEG video CODEC further includes a controller which controls both a signal sequence and a signal input/output function when a function of the MPEG video CODEC is converted to a decoding-mode and a coding-mode.

U.S. Pat. No. 5,706,367 issued on Jan. 6, 1998 to Tetsujiro Kondo describes a transmitter for transmitting digital video signals. The transmitter comprises a signal processing circuit for separating an input digital video signal into background plane data representing a still image of a background image, a memory means for individually storing the separated background plane data and each motion plane data, a motion change information detecting means for detecting information on changes of the still image stored as the motion plane data based on the input digital video signal and output of the memory means, a coding means for compressing and coding an output of the change information detecting means; and a transmitting means for transmitting the still image data of the plurality of plane data in the memory means and the change information from the coding means.

U.S. Pat. No. 5,715,005 issued on Feb. 3, 1998 to Shoichi Masaki describes a motion picture coding and decoding apparatus that divides each frame of a motion picture into a plurality of blocks and for providing a prediction error to each of the blocks between a target frame and a reference frame. A motion vector is coded for each block and stored for both the target frame and the reference frame.

U.S. Pat. No. 5,719,628 issued on Feb. 17, 1998 to Junichi Ohki describes an efficient coding system for interlaced video sequences with forced refreshing capabilities. An input picture is divided into two fields, a first and a second field. Certain lines or portions of lines in each respective field are designated for forced refreshing, while the non-designated lines are interframe prediction coded.

U.S. Pat. No. 5,754,233 issued on May 19, 1998 to Masatoshi Takashima describes an encoding apparatus that encodes pictures stored in a memory by fixed length encoding for generating a bitstream. A timing unit determines successive groups of pictures, each including at least an intra-picture on the basis of detection by a scene change detector. The timing unit also controls processing timing of the fixed length encoding of each picture in the group of pictures by the encoding apparatus. The rate control unit controls the range of the code generation rate so that if a scene change has been detected, the amount of the encoding information previously allocated to the intra-picture will be allocated to other pictures.

U.S. Pat. No. 5,781,184 issued on Jul. 14, 1998 to Steve C. Wasserman et al. describes a method and apparatus for real-time decompression and post-decompress manipulation of compressed full motion video.

U.S. Pat. No. 5,781,788 issued on Jul. 14, 1998 to Beng-Yu Woo et al. describes a single chip video compression/decompression chip connected to receive a video input from a NTSC-compatible or PAL-compatible camera and a transmit channel. Concurrently, compressed video information is input to the video codec from a receive channel, decompressed and output to the monitor or other video output device, e.g., a television set. Only a separate single module of dynamic random access memory (DRAM) is needed to provide storage for incoming and outgoing video data, compressed bit streams and reconstructed pictures for both compression and decompression procedures.

U.S. Pat. No. 5,790,199 issued on Aug. 4, 1998 to Charlene Ann Gebler et al. describes a method and apparatus for detecting and correcting error in an uncompressed digital video image data stream. The method and apparatus can identify error or partial picture scenarios. Each of the possible error or partial picture scenarios is identified in a Partial Picture Repair Unit, which causes error processing of the uncompressed video input stream, resulting in the creation of a repaired data stream on the repaired pixel bus.

U.S. Pat. No. 5,802,220 issued on Sep. 1, 1998 to Michael J. Black et al. describes a system that tracks human head and facial features over time by analyzing a sequence of images. The system analyzes motion between two images using parameterized models of image motion.

U.S. Pat. No. 5,828,866 issued on Oct. 27, 1998 to Ming C. Hao et al. describes a synchronization system that includes a motion event synchronizer and multiple application encapsulators which operate together to synchronize motion events operating in replicated multi-dimensional non-modified 3-D existing applications. The application encapsulators compress one or more user generated motion events to the motion event synchronizer.

U.S. Pat. No. 5,832,121 issued on Nov. 3, 1998 to Yuji Ando describes a method and apparatus for encoding a picture advantageously employed for encoding a picture. A plurality of input picture data are stored, and the quantity of the information of the input picture data from the plural stored picture data is evaluated for detecting a scene change.

U.S. Pat. No. 5,847,762 issued on Dec. 8, 1998 to Barth Alan Canfield et al. describes an MPEG compatible decoder that receives encoded, compressed data in the form of image representative pixel blocks. The decoder includes a frame incident to the decoding process. The previously decompressed data is re-compressed before being written to the memory. Stored decompressed data is decompressed for display or as needed for decoding functions such as motion compensation processing. The compression performed before writing data to memory is block-based compression using compressed data from one of two different compression paths which compress a given pixel block simultaneously.

U.S. Pat. No. 5,886,743 issued on Mar. 23, 1999 to Seong-Jun Oh et al. describes an object based video information coding apparatus and method for an MPEG-4 system that compresses image data without reducing image quality by converting motion-incompensable objects using image data blocks. The method includes the steps of i) separating moving and non-moving background imagery from an input image; ii) selecting motion-compensable objects and motion-incompensable objects from the moving imagery; iii) separating motion information and shape information from motion-compensable objects; iv) separating shape information and image information for motion-incompensable objects, v) dividing motion-incompensable object into N×N blocks; vi) discrete cosine tranforming pixels in the N×N blocks using an N×N discrete cosine transform.

U.S. Pat. No. 5,917,949 issued on Jun. 29, 1999 to Sung-Moon Chun et al. describes an improved grid moving method of an object image and an apparatus using the same which are capable of reducing the amount of information with respect to the image of an object by moving the grid in accordance with a position in which an image of the object having shape information exists.

European Publication No. 0,632,662 issued on Jan. 4, 1995 describes a video encoder and decoder provided with a motion compensator for motion-compensated video coding or decoding in which a picture is coded or decoded in blocks in alternately horizontal and vertical steps.

European Publication No. 0,797,181 issued on Sept. 24, 1997 describes a display controller that assists a host processor in decoding MPEG data. The display controller receives YUV data in non-pixel video format from a host CPU and performs the otherwise CPU intensive task of rasterization within the display controller.

However none of the aforementioned inventions describes a system or method for separating foreground information from background information in video data and modeling the background information using three-dimensional modeling techniques.

In particular, a scene model is a single image composed from a series of overlapping images, as would be found, for example, in a video sequence. This single image, or scene model, contains the content from all of the input images. The specific problem addressed here is to take a sequence of video frames from a camera that is panning, tilting, rolling, and zooming and create a scene model. Further, the scene model representation should allow for accurate re-projection so that the original video sequence, or some portion thereof, can be recreated from the single scene model.

Approaches for scene model generation can be categorized into two groups, those that are image-based and those that are three-dimensional world-based. Image-based scene modeling approaches typically work by finding corresponding points between pairs of images, or between an image and a growing two-dimensional scene model, or "mosaic," and "warping" one image to the other. While this approach can result in a good-looking scene model, there is no way to directly re-project the scene model to reconstruct the original video.

The second method of scene model generation seeks to recover a three-dimensional, restricted world model of the scene. With this representation it is possible to re-project the model to obtain an image as it would have appeared for any camera orientation and zoom, and hence to reconstruct the original video. It is a restricted world model in the sense that the complete three-dimensional structure of the scene is not recovered nor represented.

While some prior art methods have focused on two-dimensional scene model, or "mosaic," generation, the prior art fails to teach three-dimensional scene model generation. Hence, it would be advantageous to have a method by which three-dimensional scene models can be generated.

SUMMARY OF THE INVENTION

According to a first aspect, the present invention is a method and means for three-dimensional scene model generation, as would be used in the preceding aspect of the invention. The method comprises steps of, for each frame of video, projecting the frame onto a coordinate system used in the scene model and merging the background data of the frame with the scene model, wherein data points of the coordinate system that exist in the frame but have not already been accounted for in the scene model are added to the scene model, thus updating the scene model.

According to a second aspect, the present invention is a method and system for compressing and decompressing digital video data obtained from a video camera (or more generally, an observer or video device, which may include not only a video camera but also pre-recorded video or a computer generating video), using three-dimensional scene model generation techniques. A first software module is executed for decomposing a video into an integral sequence of frames obtained from a single camera. A second software module is executed for computing a relative position and orientation of the video camera from a plurality of corresponding points from a plurality of frames. A third software module is executed for classifying motion of the video camera. A fourth software module is executed for identifying regions of a video image containing moving foreground objects and separately encoding background and foreground data before converting the data to a standard MPEG syntax. This fourth software module includes a sub-module for generating a three-dimensional scene model that models the background data.

Accordingly, it is a principal object of the invention to provide a method and system for conducting model-based separation of background and foreground objects from digital video data, including the building of a three-dimensional scene model based on background data from an image sequence.

It is another object of the invention to provide a method and system for constructing scene models of a background that can be encoded separately from foreground objects.

It is a further object of the invention to provide a method and system of compressing and decompressing video data that include such separation of foreground and background objects and scene model generation based on the background data.

These and other objects of the present invention will become readily apparent upon further review of the following specification and drawings.

Additional Definitions

In the foregoing, "mosaic" will be used to refer to a two-dimensional scene model, while "scene model" will be used to refer to a three-dimensional scene model.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; and a hybrid combination of a computer and an interactive television. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; program or software modules; instructions; computer programs; and programmed logic.

A "computer system" refers to a system having a computer, where the computer includes a computer-readable medium embodying software to operate the computer.

A "network" refers to a number of computers and associated devices that are connected by communication facilities. A network involves permanent connections like cables or temporary connections like those made through telephone or other communication links, including wireless communication links. Examples of a network include: an internet, such as the Internet; an intranet; a local area network (LAN); a wide area network (WAN); and a combination of networks, such as an internet and an intranet.

An "information storage device" refers to an article of manufacture used to store information. An information storage device can have different forms, for example, paper form and electronic form. In paper form, the information storage device includes paper printed with the information. In electronic form, the information storage device includes a computer-readable medium storing the information as software, for example, as data. "Input/output means" refers to any device through which data can be input to or output from a system. Such means include, for example, floppy disk drives, zip drives, CD readers and writers, DVD readers, modems, network interfaces, printers, display devices (e.g., CRT), keyboards, mice, and joysticks.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention may be implemented on practically any of several well-known general-purpose computing platforms. Several systems are presented in this description for illustrative purposes only. For example, each of FIGS. 1–3 shows an illustration of a system configuration according to a first, second, and third preferred embodiment, respectively, of the present invention.

Figure 1:
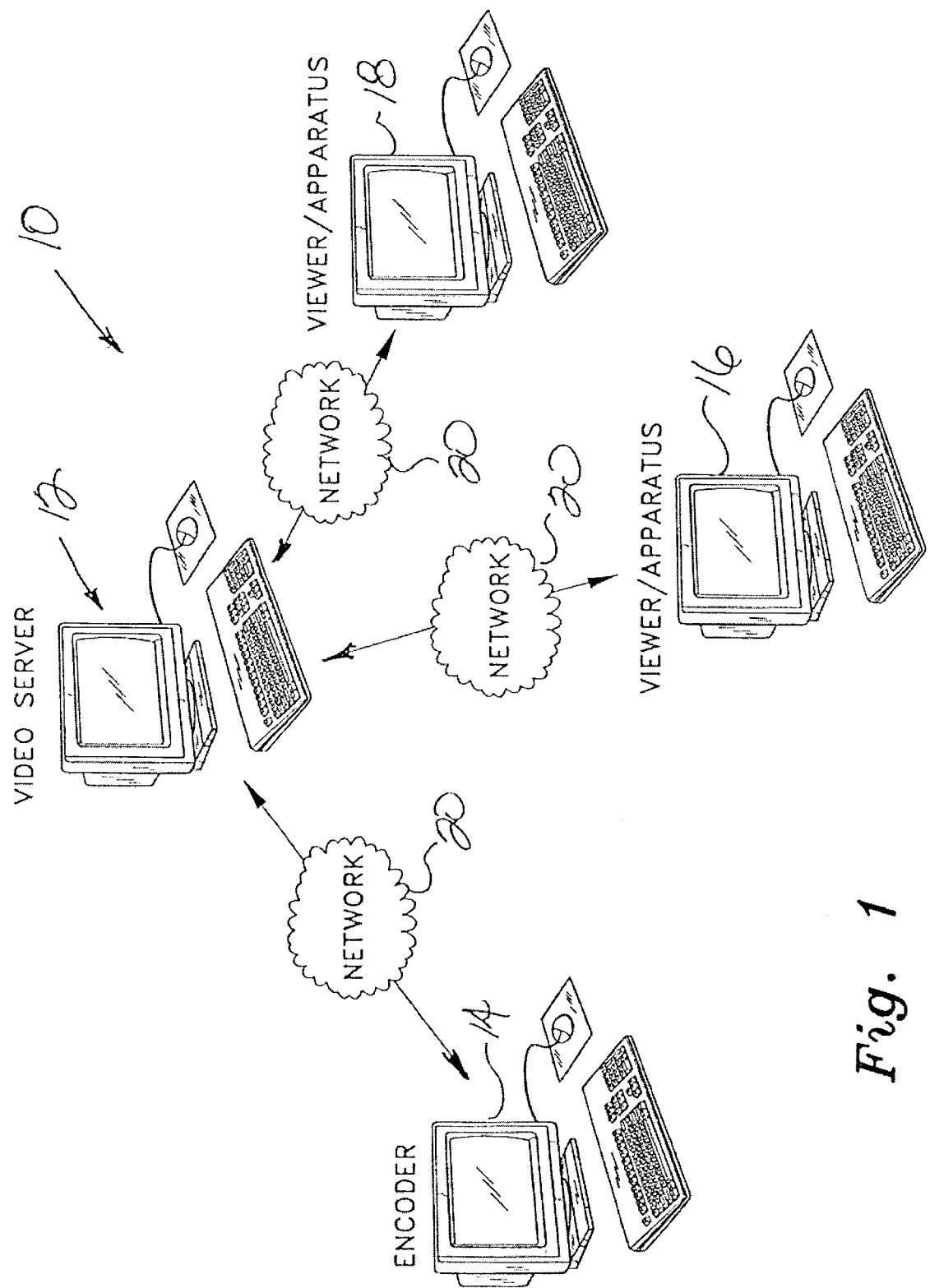
FIG. 1 is a block diagram of a video server system according to a first preferred embodiment of the present invention.

FIG. 1 shows a first preferred configuration of a video server system 10 that includes a video server 12, an encoder 14, a first viewer apparatus 16, and a second type of viewer apparatus 18, each of which is communicatively linked by an internet network 20. Preferably, the video server 12 is an Intel® Pentium II™ class PC or equivalent with 128 MB of RAM, a 10 GB hard disk, and network card. The encoder 14 is preferably an Intel® Pentium® PC or equivalent having 128 MB RAM, a 2 GB hard disk, and an audio/video capture card. The first type of viewer apparatus 16 and the second type of viewer apparatus 18 are both Intel® Pentium® PCs or equivalents having a VGA card, 4 MB VRAM and a 56 kbps modem. Accordingly, video may be encoded once on the encoder 14, uploaded to the video server (via LAN or Internet), served to each requestor in a compressed state, and decoded and played on each viewer's machine.

Figure 2:
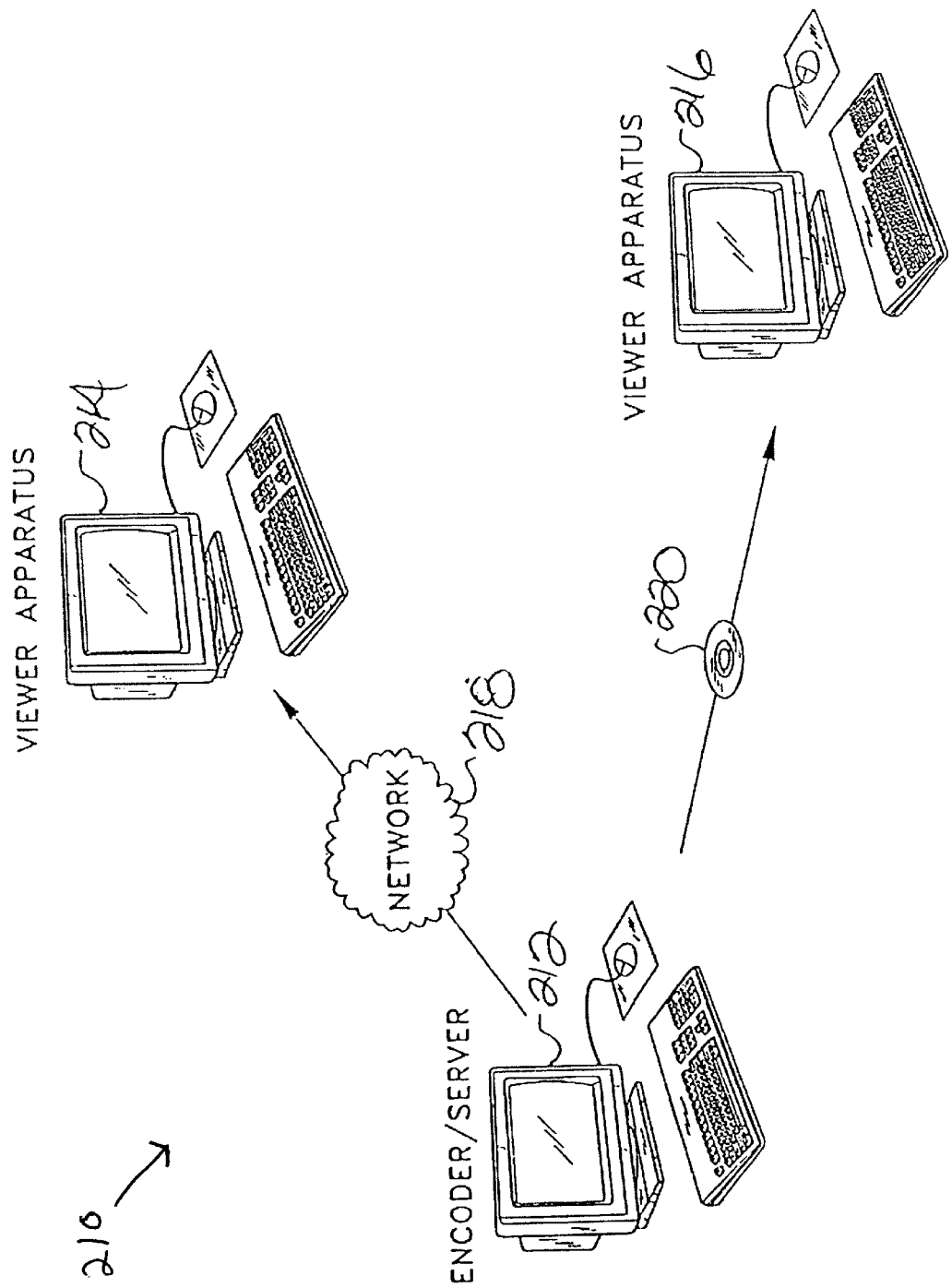
FIG. 2 is a block diagram of a video server system according to a second preferred embodiment of the present invention.
Figure 3:
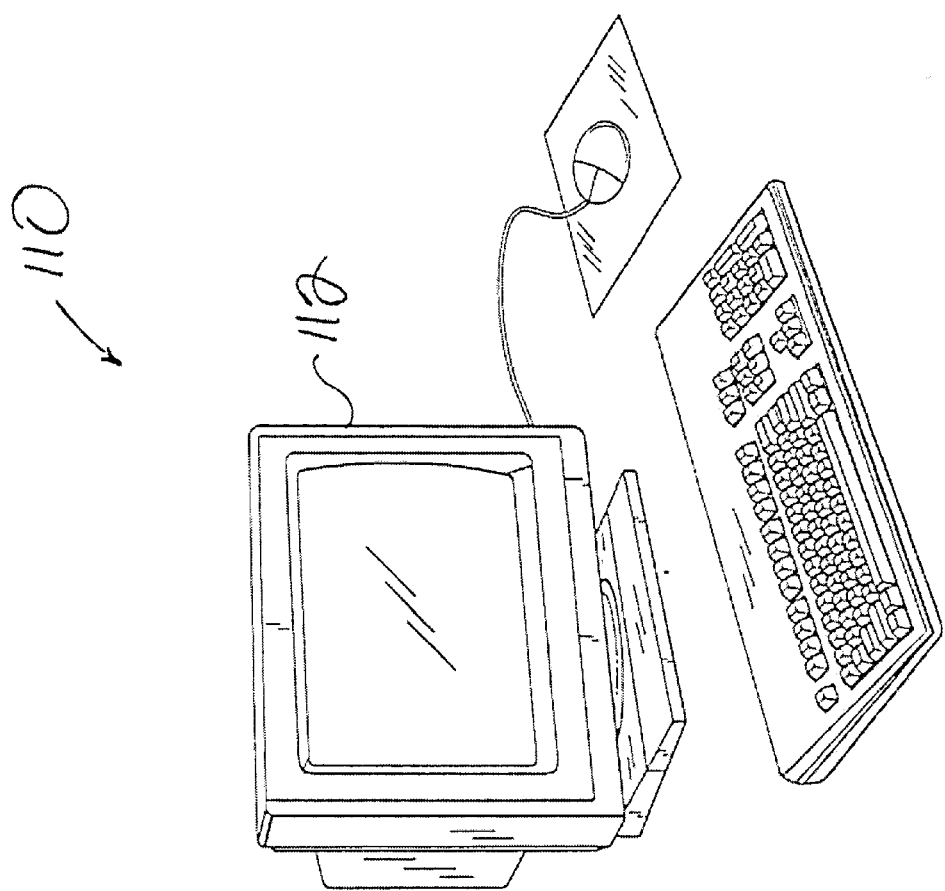
FIG. 3 is a block diagram of a video server system according to a third preferred embodiment of the present invention.

FIG. 2 shows a system 210 for a preferred tandem configuration. The system 210 includes one encoder 212 and two types of viewer apparatuses—a first type of viewer apparatus 214 and a second type of viewer apparatus 216. Preferably, the encoder 212 is communicatively connected to the first type of viewer apparatus 214 by a conventional internet or local area network 218. The encoder 212 is unattached to the second type of viewer apparatus 216; however, video data may be transferred from the encoder 212 to the second type of viewer apparatus 216 using conventional removable storage means, such as CD-ROM, DVD, zip, or the like.

Preferably, the encoder 212 is an Intel® Pentium® PC or equivalent having at least 128 MB of RAM, a 2 GB hard disk and an audio/video capture card. The first type of viewer apparatus 214 is preferably an Intel® Pentium® PC or equivalent having 128 MB of RAM, a VGA card having 4 MB of VRAM, and a 56 kbps modem. Preferably, the second type of viewer apparatus 216 is an Intel® Pentium® PC or equivalent having 128 MB of RAM, and a VGA card having 4 MB of VRAM. Using the system 210, video data may be encoded once on the encoder 212 and then transmitted to viewers via the network 218 or conventional removable storage media 220. The video data may then be decoded and viewed by a viewer at one of the two viewer apparatuses (i.e., 214 or 216).

FIG. 3 shows a computer processing apparatus 110 for compressing and decompressing video data in a stand-alone processing configuration. Preferably, the apparatus 110 is an Intel® Pentium® PC 112 or equivalent having at least 128 MB of RAM, a conventional 2 GB hard disk, a video capture card, and a VGA card with at least 4 MB VRAM. The video capture card is a conventional video capture card that may be used to input video data into the PC 112. The VGA card is a conventional VGA card having at least 4 MB of VRAM. Using this configuration, an encoder and decoder may reside in one machine. Encoded video may be stored on the hard disk. Video may be decoded during playback.

Figure 4A:
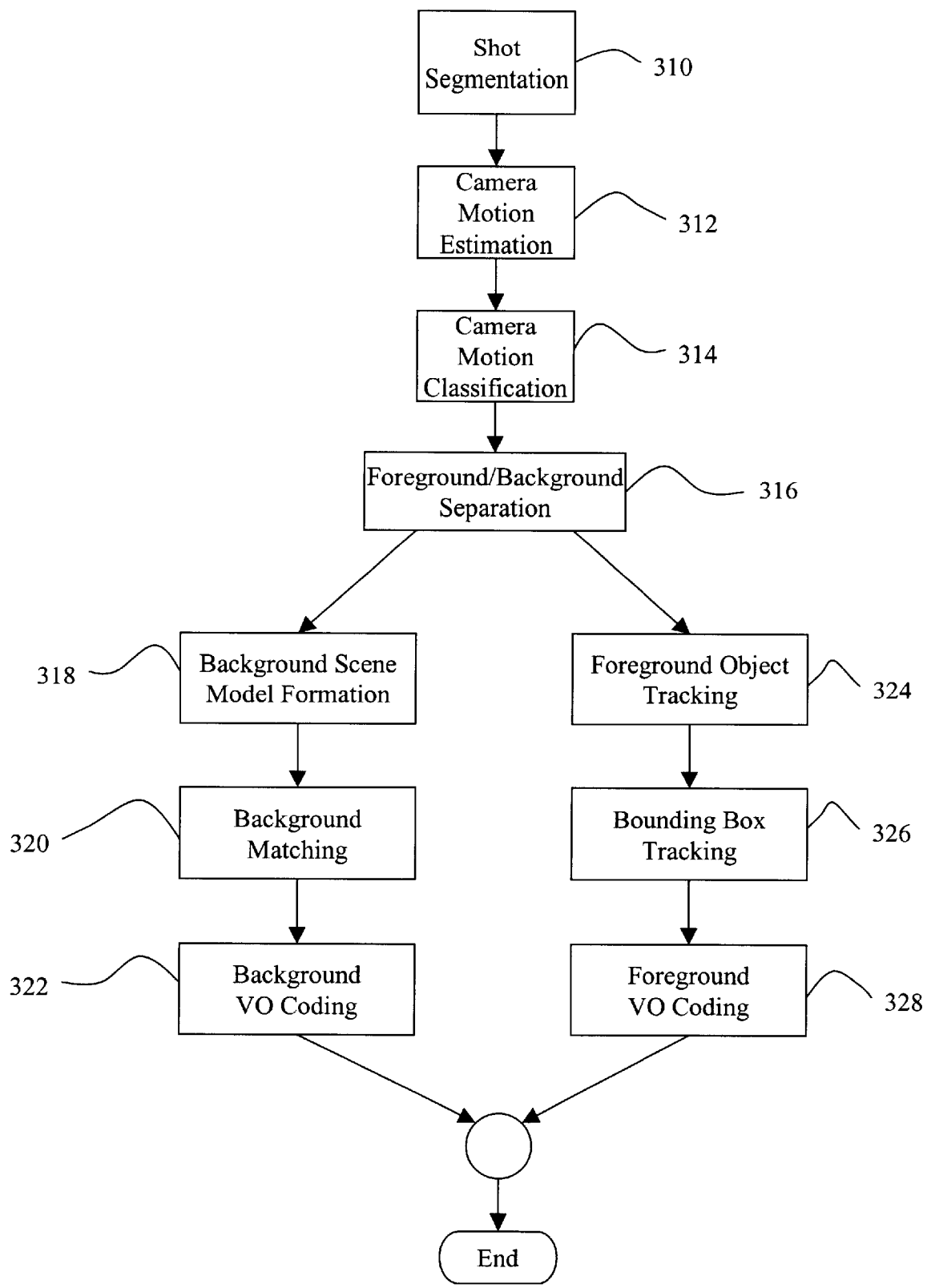
FIGS. 4(a) and 4(b) constitute a flowchart of a preferred process according to the present invention.
Figure 4B:
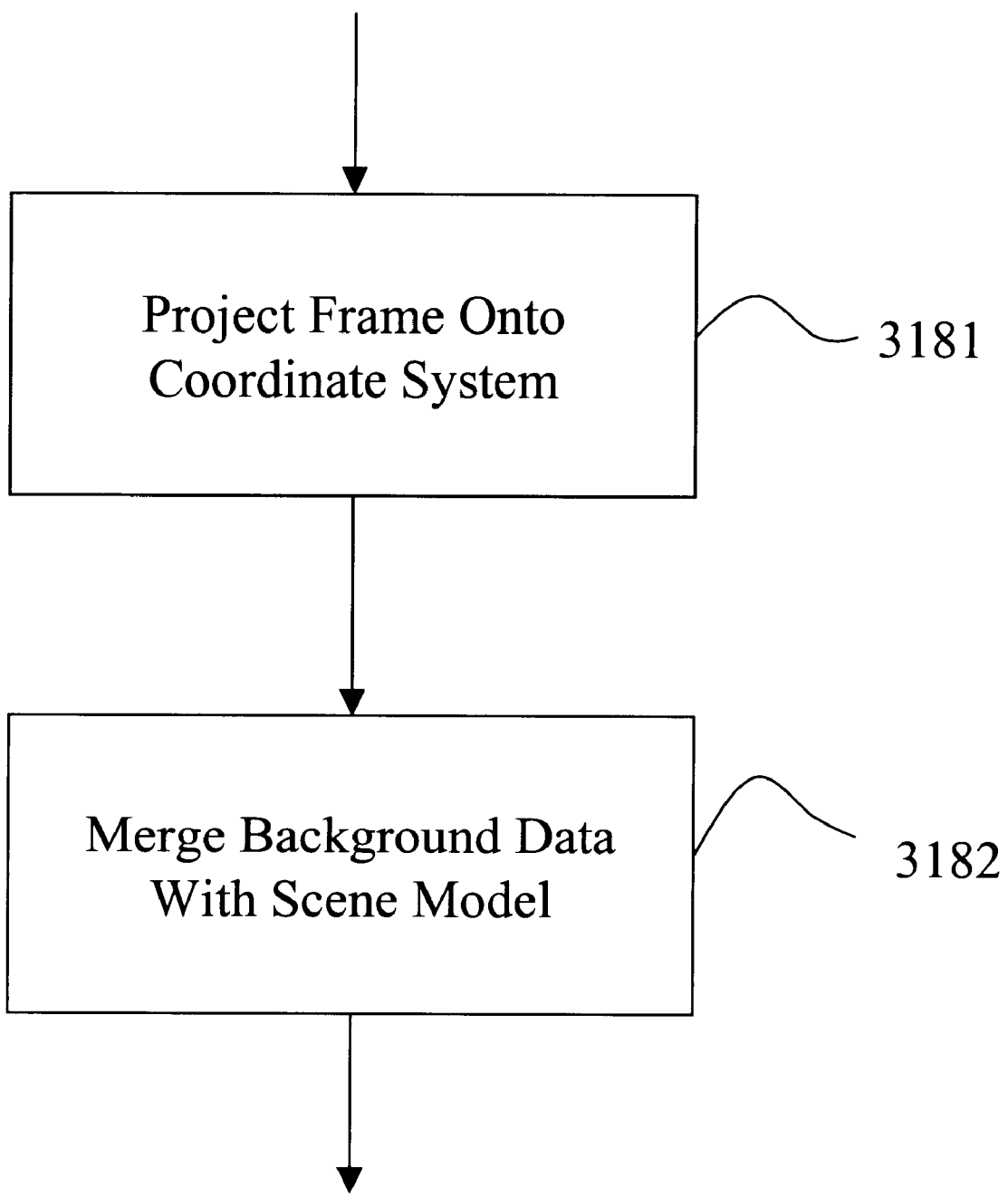
Figure 5:
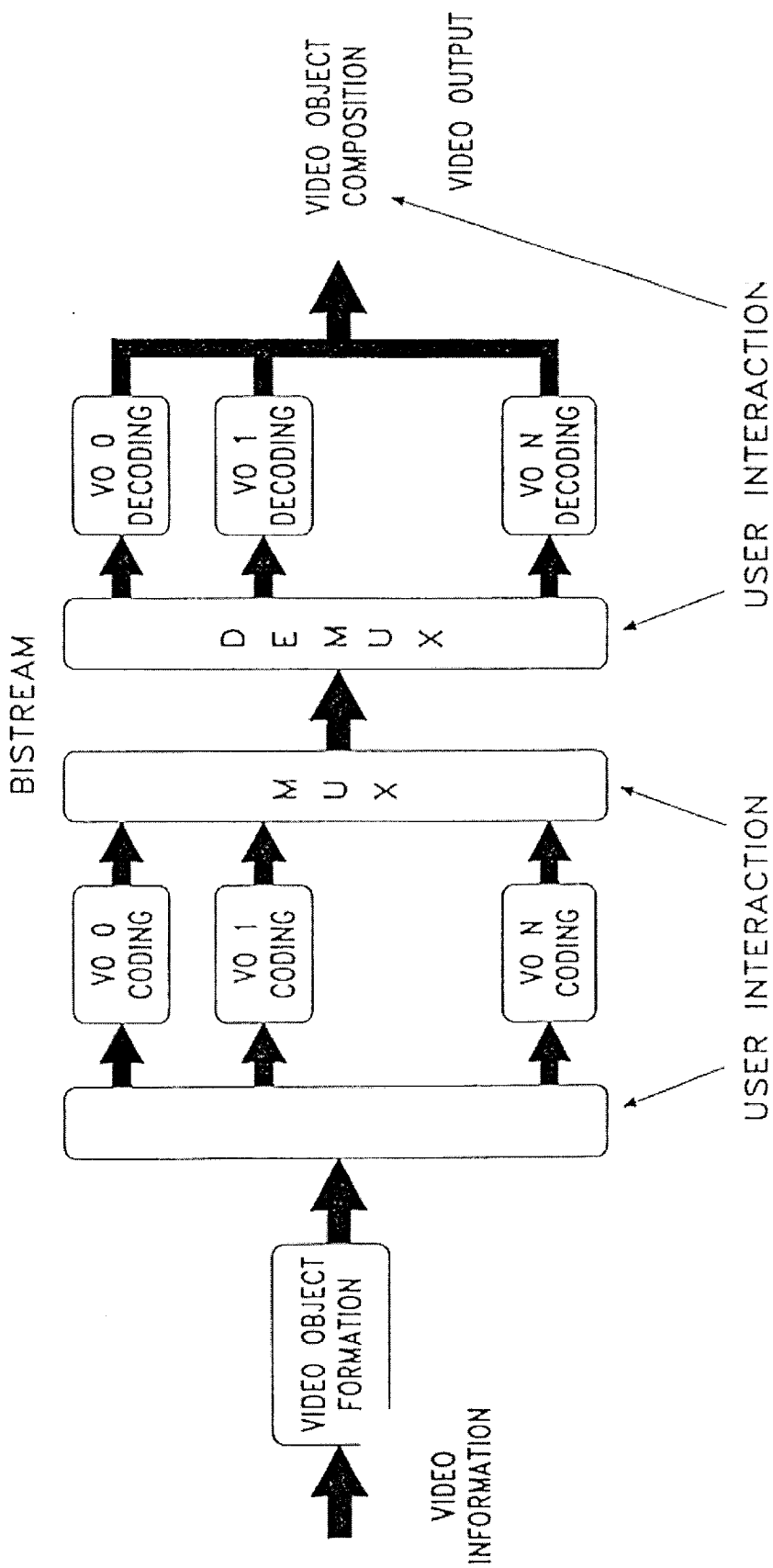
FIG. 5 is a block diagram of MPEG-4 video coding and decoding.
Figure 6:
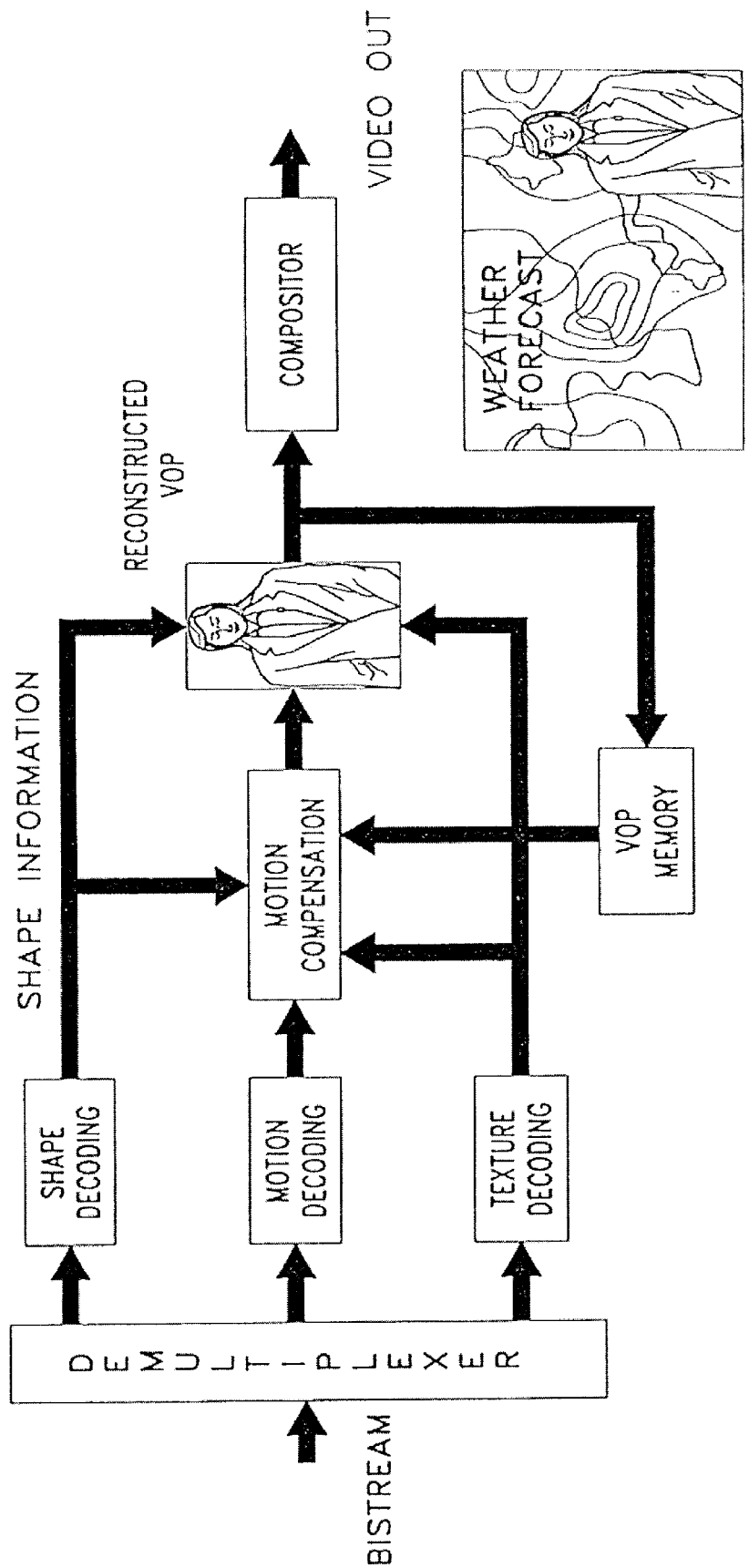
FIG. 6 is a flowchart of a known process for decoding in MPEG-4.

FIGS. 4(a) and 4(b) illustrate a preferred method for implementing the present invention. However, other processing sequences may be used to achieve substantially the same results and benefits as described in this application. The preferred method is preferably compatible with the MPEG-4 standard of video encoding.

According to a preferred embodiment of the present invention, encoding software is used to take digital video data and compress the video data into a standard MPEG-4 file format. The video data may then be distributed to any number of viewers in a variety of ways (e.g., removable storage media 220 or a network 20 or 218), as illustrated in FIGS. 1 and 3. Regardless of how the video data is transmitted to a viewer, a viewer apparatus can use a standard MPEG-4 video player with embedded MPEG-4 decoder to uncompress and display the reconstructed video.

A description of the steps according to the preferred method will now be described.

Shot Segmentation. The first step of the preferred method is execution of a first step 310 (hereinafter referred to as "shot segmentation") for decomposing a video into an integral sequence of frames obtained from a single camera. When a video is produced, it is often edited by combining segments obtained from different cameras and/or camera angles or from the same camera at different times. Execution of shot segmentation 310 results in transitions, known as shot breaks, that demarcate the points of editing. This process enables downstream processing to be carried out on frames with continuous camera motion and containing a common background scene.

Numerous algorithms are known to be capable of performing shot segmentation step 310. The particular algorithm used is immaterial to the present invention, although better compression may be obtained by employing techniques yielding cleaner segmentations. Oversegmentation of a video sequence may require encoding additional background scene models unnecessarily, while undersegmentation may introduce an artifact in the encoded video due to incorrect insertion of background by the viewer.

Camera Motion Estimation. The second step 312 of the preferred method consists of a step (hereinafter referred to as "camera motion estimation") for computing the relative position and orientation of the camera, given a set of corresponding points in multiple frames. Alternatively, the camera motion estimation step 312 serves to compute camera motion from optic flow (i.e., the time-derivative of image intensity) at selected points in the image.

The key to obtaining the maximum achievable compression is the accurate computation of the motion of the camera. Camera motion estimation 312 computes the relative position and orientation of the camera, given a set of corresponding points in multiple frames. The computation for current frame camera parameters relies on having an initial estimate of those parameters. Initially the previous frame parameters are used. Several strategies are then used to refine this estimate for the current frame. These include the use of a multi-resolution hierarchy for coarse-to-fine camera parameter estimates, iteratively sampling several sets of randomly chosen points at a given level of the hierarchy to obtain a best estimate for that level, and incrementally updating the estimate computed for a given set of randomly chosen points. Each of these strategies is described in the sections that follow for the task of computing camera parameters for the current frame.

Traversing Hierarchical Levels. A multi-resolution hierarchy for the current frame is constructed. High levels in the hierarchy correspond to greater amounts of spatial. The lowest level corresponds to the original pixels of the current frame. Camera parameter refinement proceeds from coarse refinement at the most smoothed level to fine refinement at the level of no smoothing. The initial estimate of camera parameters is updated as each level of the hierarchy is traversed.

The following pseudo code illustrates the hierarchy traversal processing.

Traverse Hierarchy Levels.
Input:
  $M_P$: camera parameters for previous frame (i.e., an initial estimate)
  $I_R$: reference scene model
  $I_C$: current video frame
Output:
  $M_O$: camera parameters estimate for current frame
Processing:
  $M_C = M_P$
  P=multi-resolution hierararchy image constructed from $I_C$
  For each level of the hierarchy, from most smoothed to no smoothing:
    $M_L$=updated M estimate for level L, computed using $M_C$, $I_R$, and P at current level.
    $M_O = M_L$
  End For Iterative Point Sampling. At a given level of the multi-resolution hierarchy, camera parameters are refined by iterating over several sets of randomly chosen points.

Obtain Best M Estimate at a Given Level of the Hierarchy
Input:
  $M_O$: camera parameters initial estimate
  $I_R$: reference scene model
  P: Multi-resolution hierarchy at given level
Output:
  $M_L$: camera parameters estimate for given level
Processing:
  Iterate a specified number of times:
    Pts=new set of N randomly chosen points in current image frame
    $M_R$, e=camera parameters refined estimate and error metric obtained using $M_O$, Pts, P, and $I_R$
    If $M_R$ is better estimate than thus far obtained, then
      $M_L = M_R$
  End Iteration Incremental Parameter Updates. Using a given set of N randomly chosen points at a given level of the multi-resolution hierarchy, a refined estimate of M is obtained. The camera parameter update computation produces a ΔM to be added to the initial estimate of camera parameters M. In each refinement iteration a percentage of this ΔM is added to the initial estimate for the next iteration. In this way a solution for M is converged upon with finer and finer ΔM's being added in. The following pseudo code illustrates this process:

Update of M Using Iterative Refinement
Input:
  Pts: set of N randomly chosen points
  $M_O$: camera parameters initial estimate
  $I_R$: reference scene model
  P: multi-resolution hierarchy at given level
Output:
  $M_R$: camera parameters estimate refined using given set of N points
Processing:
  $M_{Ot} = M_O$
  Iterate until converged (ΔM is 0) or until a preset maximum number of refinements is performed:
    ΔM=result of camera parameter update computation, using $M_{Ot}$, Pts, $I_R$, and P.
    $M_{Ot} = M_{Ot}$+specified percentage of ΔM
  End Iteration.
  $M_R = M_{Ot}$ Camera Parameter Update Computation. We start with a model of equality between pixel intensities in the reference scene model $I_R$ and the current image I, given that camera parameters with respect to the reference scene model are accounted for in camera parameters matrix M:

$$I(M\vec{X}) = I_R(\vec{X})$$

M is a 3 by 3 matrix that describes the camera orientation with respect to the reference scene model. Camera motion is limited to rotation and zoom in this derivation. M consists of terms for focal length (f), pixel size ($s_x$, $s_y$), image center ($c_x$, $c_y$), and a 3 by 3 rotation matrix $\mathfrak{R}$.

$$M = \begin{bmatrix} f \cdot s_x & 0 & c_x \\ 0 & f \cdot s_y & c_x \\ 0 & 0 & 1 \end{bmatrix} [R]$$

X is a 3-space direction vector in reference scene model coordinates.

$$\vec{X} = \begin{bmatrix} u \\ v \\ w \end{bmatrix}$$

A Taylor series expansion of the image equality expression gives the following:

$$I(M_O\vec{X}) = \nabla I_{uvw}{}^T(M_O\vec{X})\Delta M\vec{X} + \text{higher order terms} = I_R(\vec{X})$$

$M_O$ is an initial estimate of M. $\nabla I_{uvw}$ is a 3-vector of partial derivatives of I with respect to homogeneous coordinates u, v, and w. ΔM is an additive update to be applied to $M_O$. Neglecting higher-order terms, this equation is linear in the terms of ΔM. Rearranging and making the terms of ΔM explicit, $$\begin{bmatrix} \frac{\partial I}{\partial u} & \frac{\partial I}{\partial v} & \frac{\partial I}{\partial w} \end{bmatrix} \begin{bmatrix} m_{11} & m_{12} & m_{13} \\ m_{21} & m_{22} & m_{23} \\ m_{31} & m_{32} & m_{33} \end{bmatrix} \begin{bmatrix} u \\ v \\ w \end{bmatrix} = I_R(\vec{X}) - I(M_0 \vec{X})$$

M can be determined up to a scale factor, so its lower right term is arbitrarily set to 1, and the lower right term of ΔM is thus set to 0. Using eight randomly chosen points, the above can be expressed as a system of equations with unknowns being the terms of ΔM:

$$\begin{bmatrix} \frac{\partial I}{\partial u_1}u_1 & \frac{\partial I}{\partial u_1}v_1 & \frac{\partial I}{\partial u_1}w_1 & \frac{\partial I}{\partial v_1}u_1 & \frac{\partial I}{\partial v_1}v_1 & \frac{\partial I}{\partial v_1}w_1 & \frac{\partial I}{\partial w_1}u_1 & \frac{\partial I}{\partial w_1}v_1 \\ \frac{\partial I}{\partial u_2}u_2 & \frac{\partial I}{\partial u_2}v_2 & \frac{\partial I}{\partial u_2}w_2 & \frac{\partial I}{\partial v_2}u_2 & \frac{\partial I}{\partial v_2}v_2 & \frac{\partial I}{\partial v_2}w_2 & \frac{\partial I}{\partial w_2}u_2 & \frac{\partial I}{\partial w_2}v_2 \\ \frac{\partial I}{\partial u_3}u_3 & \frac{\partial I}{\partial u_3}v_3 & \frac{\partial I}{\partial u_3}w_3 & \frac{\partial I}{\partial v_3}u_3 & \frac{\partial I}{\partial v_3}v_3 & \frac{\partial I}{\partial v_3}w_3 & \frac{\partial I}{\partial w_3}u_3 & \frac{\partial I}{\partial w_3}v_3 \\ \frac{\partial I}{\partial u_4}u_4 & \frac{\partial I}{\partial u_4}v_4 & \frac{\partial I}{\partial u_4}w_4 & \frac{\partial I}{\partial v_4}u_4 & \frac{\partial I}{\partial v_4}v_4 & \frac{\partial I}{\partial v_4}w_4 & \frac{\partial I}{\partial w_4}u_4 & \frac{\partial I}{\partial w_4}v_4 \\ \frac{\partial I}{\partial u_5}u_5 & \frac{\partial I}{\partial u_5}v_5 & \frac{\partial I}{\partial u_5}w_5 & \frac{\partial I}{\partial v_5}u_5 & \frac{\partial I}{\partial v_5}v_5 & \frac{\partial I}{\partial v_5}w_5 & \frac{\partial I}{\partial w_5}u_5 & \frac{\partial I}{\partial w_5}v_5 \\ \frac{\partial I}{\partial u_6}u_6 & \frac{\partial I}{\partial u_6}v_6 & \frac{\partial I}{\partial u_6}w_6 & \frac{\partial I}{\partial v_6}u_6 & \frac{\partial I}{\partial v_6}v_6 & \frac{\partial I}{\partial v_6}w_6 & \frac{\partial I}{\partial w_6}u_6 & \frac{\partial I}{\partial w_6}v_6 \\ \frac{\partial I}{\partial u_7}u_7 & \frac{\partial I}{\partial u_7}v_7 & \frac{\partial I}{\partial u_7}w_7 & \frac{\partial I}{\partial v_7}u_7 & \frac{\partial I}{\partial v_7}v_7 & \frac{\partial I}{\partial v_7}w_7 & \frac{\partial I}{\partial w_7}u_7 & \frac{\partial I}{\partial w_7}v_7 \\ \frac{\partial I}{\partial u_8}u_8 & \frac{\partial I}{\partial u_8}v_8 & \frac{\partial I}{\partial u_8}w_8 & \frac{\partial I}{\partial v_8}u_8 & \frac{\partial I}{\partial v_8}v_8 & \frac{\partial I}{\partial v_8}w_8 & \frac{\partial I}{\partial w_8}u_8 & \frac{\partial I}{\partial w_8}v_8 \end{bmatrix} \begin{bmatrix} \Delta M_{11} \\ \Delta M_{12} \\ \Delta M_{13} \\ \Delta M_{21} \\ \Delta M_{22} \\ \Delta M_{23} \\ \Delta M_{31} \\ \Delta M_{32} \end{bmatrix} = \begin{bmatrix} I_R(\vec{X}_1) - I(M_0 \vec{X}_1) \\ I_R(\vec{X}_2) - I(M_0 \vec{X}_2) \\ I_R(\vec{X}_3) - I(M_0 \vec{X}_3) \\ I_R(\vec{X}_4) - I(M_0 \vec{X}_4) \\ I_R(\vec{X}_5) - I(M_0 \vec{X}_5) \\ I_R(\vec{X}_6) - I(M_0 \vec{X}_6) \\ I_R(\vec{X}_7) - I(M_0 \vec{X}_7) \\ I_R(\vec{X}_8) - I(M_0 \vec{X}_8) \end{bmatrix}$$

$\Delta M$ is then obtained by inverting the coefficient matrix on the left and post-multiplying it by the column vector on the right (note that more than eight points can be used in this formulation). In this case a pseudo-inverse is used for the coefficient matrix.

Coordinate Conversions. $\Delta M$ is a 3-vector of partial derivatives of the current image with respect to homogeneous coordinates u, v, and w. These are expressed in terms of partial derivatives with respect to image column and row coordinates (c, r), focal length (f), and u, v, and w:

$$\frac{\partial I}{\partial u} = \frac{\partial I}{\partial c}\frac{f}{w}$$

$$\frac{\partial I}{\partial v} = \frac{\partial I}{\partial r}\frac{f}{w}$$

$$\frac{\partial I}{\partial w} = \frac{\partial I}{\partial c}\frac{(-fu)}{w^2} + \frac{\partial I}{\partial r}\frac{(-fv)}{w^2}$$

Conversions from 3-space homogeneous coordinates $X_R$ and 2-D image coordinates for a given image are performed by mapping the 3-space vector through the M matrix for the image, and accounting for focal length:

$$\vec{X}' = M \vec{X}_R = \begin{bmatrix} u' \\ v' \\ w' \end{bmatrix}$$

$$\begin{bmatrix} c \\ r \end{bmatrix} = \begin{bmatrix} \frac{u'f}{w'} + \frac{cols}{2} \\ \frac{v'f}{w'} + \frac{rows}{2} \end{bmatrix}$$

The inverse mapping is similar, to convert from an image coordinate (c, r) to a 3-space homogeneous coordinate $X_R$. We construct a homogeneous image coordinate by using the focal length in the third element, and then map it through the inverse of the M matrix for the image:

$$\vec{X}_R = M^{-1} \begin{bmatrix} c - \frac{cols}{2} \\ r - \frac{rows}{f^2} \end{bmatrix}$$

Camera Motion Classification. The third step of the preferred method consists of a step 314 (hereinafter called "camera motion classification") of classifying motion of a camera used to produce the video data. According to the present invention, subsequent steps of the preferred method will depend upon the classification of the camera's motion (e.g., static, pure rotation, pure zoom, rotation with zoom, general motion) that is present in a given video segment. The classification is determined by analyzing the values of $\Delta M$ that are computed by camera motion estimation for each frame in a sequence. Conventional techniques in linear algebra are employed to classify the form of each $\Delta M$. Preferably, the most restrictive class that satisfies all frames within a predefined threshold is designated as the classification for a video segment.

Foreground/Background Separation. A fourth step 316 (hereinafter referred to as the "foreground/background separation") in the preferred method is for identifying regions of an image containing moving foreground objects. Everything in an image that is not moving is considered to be background. Candidate moving-object regions are obtained by reprojecting a given frame into the coordinate system of a background scene model. This removes the apparent image motion of all background objects resulting from camera motion. In contrast, reprojection is unnecessary where a camera is static. The reprojected frame is removed from the background scene model to identify pixels whose intensity differs by an amount that exceeds a predefined threshold. These pixels are then subjected to morphological filtering in both the spatial and temporal dimensions. A spatio-temporal erosion operation is applied first to eliminate short-lived and tiny foreground regions. Then a spatio-temporal dilation operation is applied to fill in small holes and smooth over short-lived dropouts. The result is a much cleaner separation of foreground objects that permits a more efficient coding for compression.

Background Scene Model Formation. A fifth step 318 (hereinafter referred to as the "background scene model formation") is performed after the foreground/background separation module 316 to create a single scene model of a background for each camera. This process is further explained with reference to FIG. 4(b).

By using the relative camera motion computed by the camera motion estimation module 312, each frame may be reprojected to the coordinate system of a background scene model for that frame, as shown in Block 3181. This step is unnecessary where a static camera is used. The background pixels of the given frame are then merged with the background scene model, in one of several ways depending upon the nature of the desired result, as shown in Block 3182. Background pixels that appear in the reprojected frame are simply added to the scene model at the corresponding location. Background pixels already defined in the scene model that overlap pixels in the reprojected frame can be averaged, replaced, or blended, as desired.

As discussed above, a scene model is a three-dimensional representation of the background video data. For purposes of representation, a coordinate system, that is, a "restricted world model" is first developed for use in step 318. It is instructive to begin with a spherical model and then to treat other models.

Figure 7:
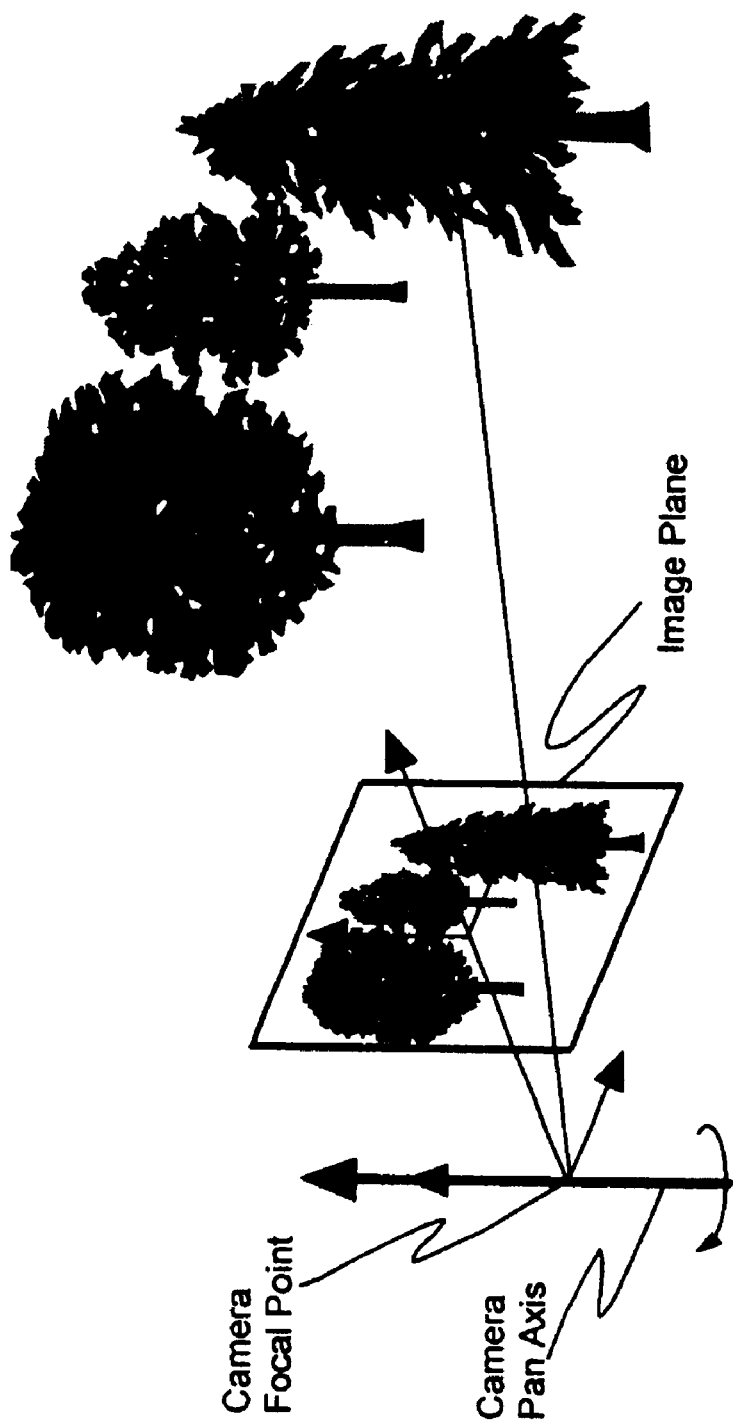
FIG. 7 shows imaging geometry when video data is generated.
Figure 8:
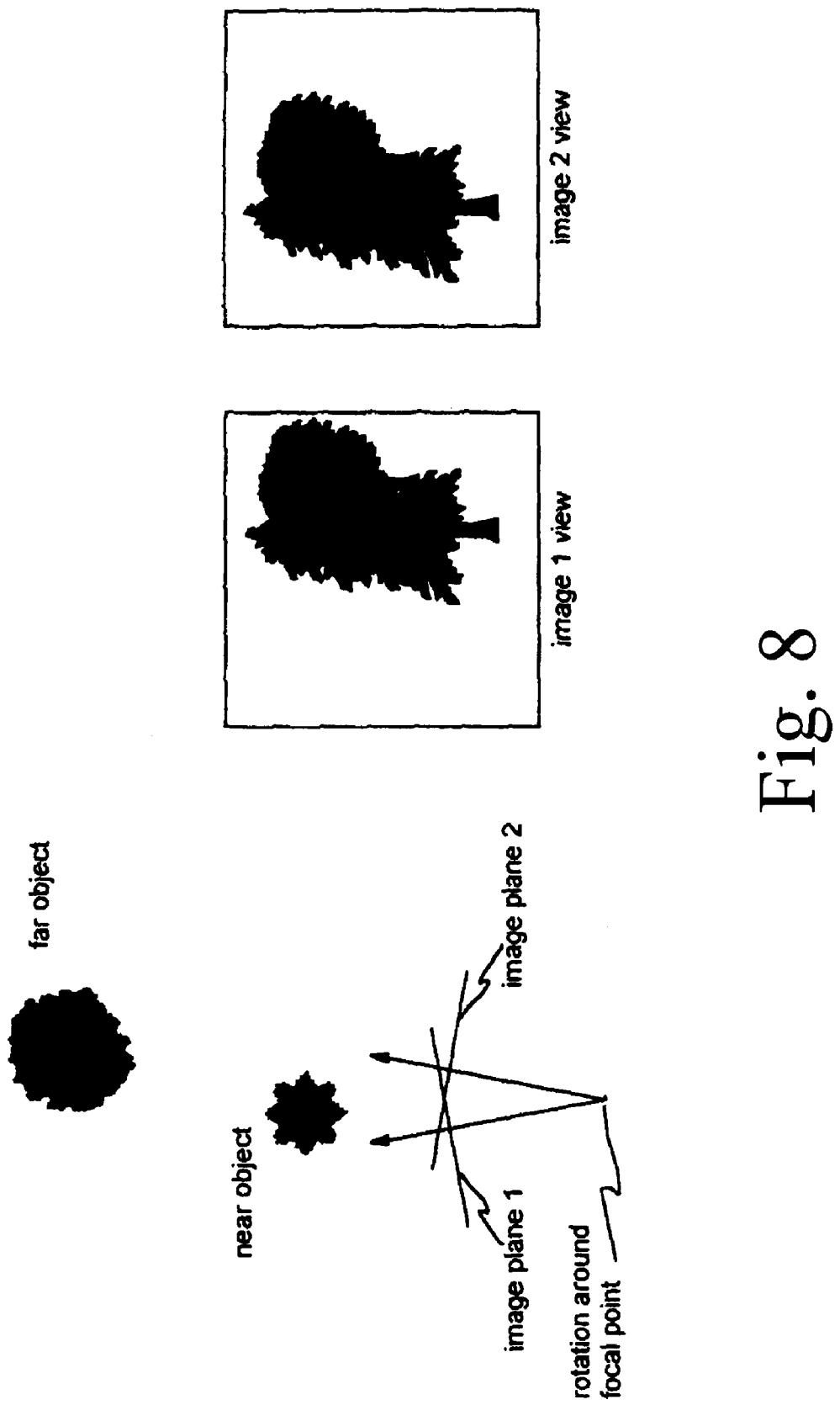
FIG. 8 shows an aerial view of the imaging geometry.

FIGS. 7 and 8 show the imaging geometry for a rotating camera or other observation means. Note that as the camera pans about the optical center of the camera, the relative positioning within the image of the near and far trees remains the same. That is, no new portion of the far tree becomes visible or becomes occluded as the camera pans. This is also true if the camera tilts, rolls, or changes zoom, so long as the rotation is about the optical center of the camera. If rotation is not about the optical center then the rotation effectively introduces a translational component and some portion of the far tree will become uncovered or some visible portion will become occluded.

Because no new portion of the scene becomes uncovered or becomes visible as a camera pans, tilts, rolls, or changes zoom, everything that can be seen from the fixed camera position can be represented on the surface of a sphere, as discussed, for example, in E. H. Adelson and J. R. Bergen, "The Plenoptic Function and the Elements of Early Vision," in *Computational Models of Visual Processing*, Ch. 1 (M. Landy and J. A. Movshon, eds.), The MIT Press, Cambridge, Mass., 1991. This sphere then becomes the scene model, the three-dimensional equivalent of an image mosaic. Conceptually one can think of the camera in the scene but with a sphere surrounding it. The optical center of the camera is positioned at the center of the sphere, and images are collected as though the sphere did not exist. As the camera rotates, the captured images are pasted onto the portion of sphere surface where the camera is pointing. This idea will be developed further below by defining the mapping from each image in a video sequence to the sphere surface.

Coordinate Systems. This section discusses the relationship between an image and a spherical scene model; this was addressed, in part, above. Image coordinates are converted to homogeneous coordinates, and the matrix M is used to map between an image and the sphere scene model. As described above, M models the orientation of the camera. Specifically, M is a 3 by 3 matrix that describes the camera orientation with respect to the sphere scene model coordinate system, which has three axes labeled U, V, and W. Conversion of a 3-space homogeneous vector, $\vec{X}_{sm}$, from the sphere scene model coordinate system to 2D image coordinates is performed by mapping the 3-space vector through the M matrix for the image, and accounting for the focal length in use. This goes according to the following equations:

$$\vec{X}' = M\vec{X}_{sm} = \begin{bmatrix} u' \\ v' \\ w' \end{bmatrix}; \quad \begin{bmatrix} c \\ r \end{bmatrix} = \begin{bmatrix} \frac{u'f}{w'} + \frac{cols}{2} \\ \frac{v'f}{w'} + \frac{rows}{2} \end{bmatrix}.$$

Here, f represents focal length, c and r are image coordinates, and cols and rows are, respectively, the width and height of the image.

The inverse mapping is similar. To convert from an image coordinate (c, r) to a 3-space homogeneous coordinate $\vec{X}_{sm}$, we construct a homogeneous image coordinate by using the focal length in the $3^{rd}$ element, and then map it through the inverse of the M matrix for the image, as follows:

$$\vec{X}_{sm} = M^{-1} \begin{bmatrix} c - \frac{cols}{2} \\ r - \frac{rows}{2} \\ f \end{bmatrix}.$$

Alternatives to a Sphere. The previous sections described how to map between images and a sphere scene model. However, actually using a sphere for implementation may not be the best choice. In fact, any three-dimensional surface can be used. The only real difference is that the effective resolution varies with the distance of the surface from the camera's optical center; however, this variation is generally fairly small.

The factors that guide one's choice of surface are as follows.

keep complexity of implementation to a minimum;

keep singularities to a minimum;

keep oversampling to a minimum;

do no undersampling; and easily conform to the MPEG-4 standard.

A cube meets all of these criteria reasonably well and is the preferred implementation of scene models according to the present invention.

In order to actually use a cube to implement the scene model, the mapping defined in the previous section for relating an image to a sphere scene model is used, and an additional mapping from the spherical coordinate system to a cube coordinate system is used, as well. In general, for any other three-dimensional surface, such an additional mapping is used.

Cube Scene Model. To use a cube to implement a sphere scene model, the coordinate systems of the cube are first defined. Next, the transformations between the cube, the cube faces, and the spherical coordinate system defined above is then defined in terms of the coordinate systems of the cube.

Figure 9:
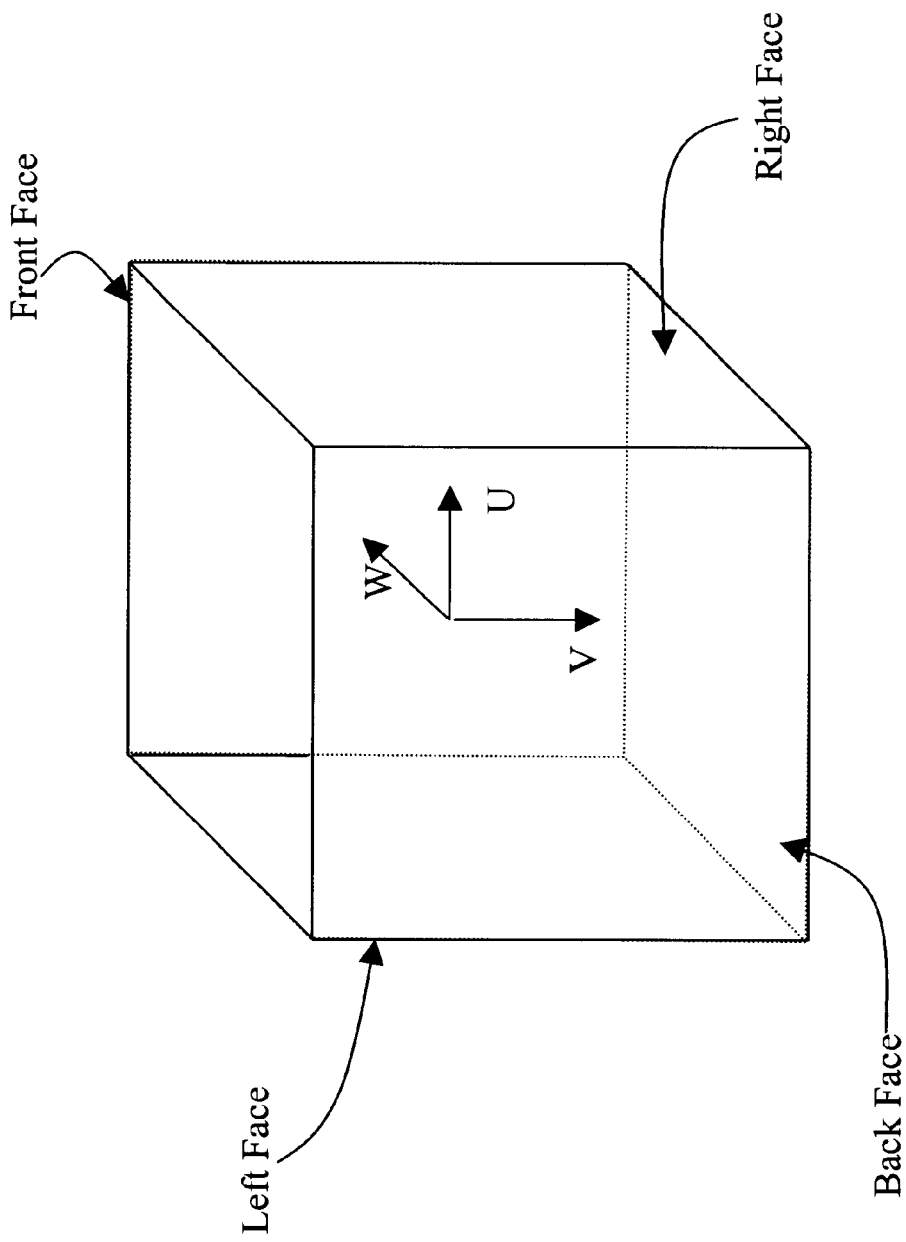
FIG. 9 shows a coordinate system for a cube used in scene model generation according to a preferred embodiment of the invention.

Coordinate Systems. A cube is composed of six planes or faces. Each of these planes is represented as a separate image with identical dimensions, and each has its own coordinate system. In addition, there is a separate coordinate system for the cube as a whole, which is the same as the spherical coordinate system presented earlier. The coordinate system of the cube is composed of the U, V, and W axes as shown in FIG. 9. The origin of the coordinate system is in the center of the cube. The positive W direction is through the front face. The positive U direction is through the right face. And the positive V direction is through the bottom face.

Figure 10B:
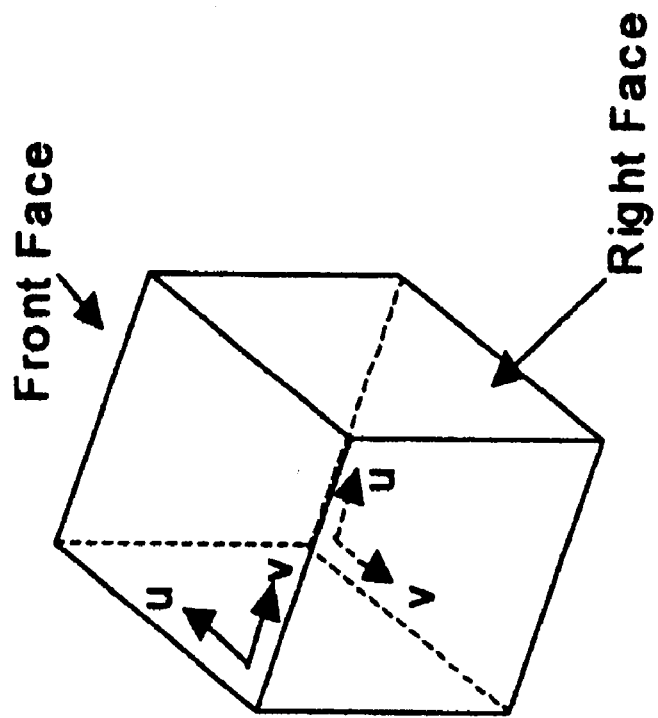
FIGS. 10(a) and 10(b) show coordinate systems for the faces of a cube used in scene model generation according to a preferred embodiment of the invention.
Figure 10A:
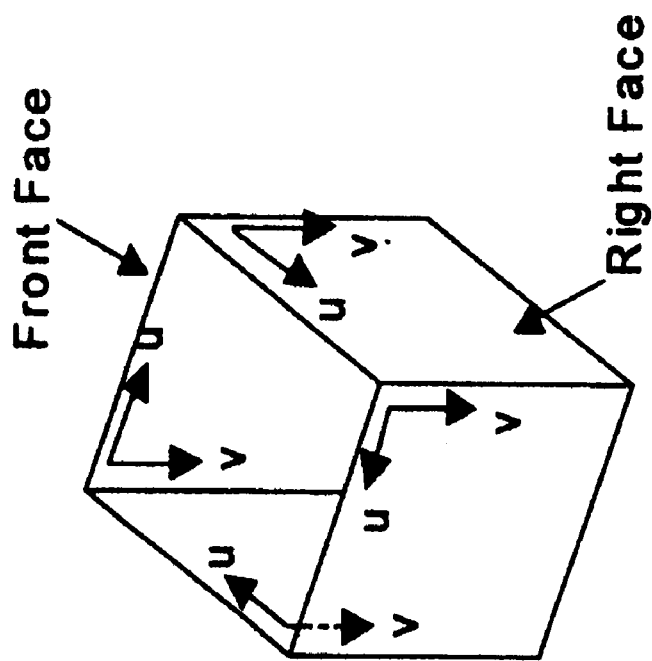

The coordinate system of each cube face is composed of a row and column axis. The location of the origin and the positive direction for each face is shown in FIGS. 10(*a*) and 10(*b*). Each cube face is represented as a separate image with the column index increasing from left to right and the row index increasing from top to bottom.

Transforming Between Coordinate Systems. The following algorithm is used to transform a vector, $\overline{V}$, in the cube coordinate system to a point in the coordinate system of a cube face. Note that the determination of "CubeSize," found in the algorithms below, will be discussed subsequently.

Algorithm 1: Transforming a vector in the cube coordinate system to a point on a cube face

```
For each cube face {
    //find the angle between V and the normal, N, of the cube
    //face. N is with respect to the cube coordinate system.
    Compute the inner product of V and N. //There is no need
                                          //to normalize V or N
    Is this inner product the smallest so far?
        If yes, remember the inner product and the cube face
}
// The cube face with the smallest inner product is the cube
// face that V intersects
Call the intersection cube face F
Rotate V by the angle between the positive w axis and the
normal to F.
Call this new vector V'
// V' is the same as V but now with respect to F
Assign x to (CubeSize / 2) * (u component of V') /
              (w component of V')
Assign y to (CubeSize / 2) * (v component of V') /
              (w component of V')
// x and y give the intersection of V with the cube face with
//respect to a coordinate system centered on the cube face.
    Assign x' to (CubeSize / 2) – x
    Assign y' to (cubeSize / 2) – y
// x' and y' now give the row and column location of the
//intersection of V
```

The following algorithm is used to transform a point (x, y) on a cube face, F, to a vector V, in cube coordinates. (x, y) is in a coordinate system where the origin is located at the center of the face.

```
Algorithm 2
    Assign u to x/(CubeSize / 2)
    Assign v to y/(CubeSize / 2)
    Assign w to (CubeSize / 2)
    Rotate V by the angle between the positive w axis and the
    normal to f.
    //This new vector is the answer.
```

Implementation Issues. There are numerous implementation issues for a cube scene model. These include determining the proper size for the cube, handling changes in focal length, eliminating artifacts when reprojecting, reducing the required storage, and representing non-existent, or non-used, portions of the cube scene model. Each of these issues will be discussed below.

Determining Cube Size. If the cube scene model size is not set correctly, undersampling or excessive oversampling of the image being added will result. Oversampling will do no harm other than increase the storage requirements for the cube scene model, but undersampling will degrade the quality of the scene model. In order to determine the best size for the cube, the field of view of the camera is used, and the size is set such that if the width of the image being inserted into the scene model is n, then the width of the data that was added into the scene model should preferably be at least n pixels wide. In a preferred embodiment of the invention, cube face image size is a function of the field of view of the camera and is given by the following equation:

$$Cubesize = \frac{\max(ImageWidth, ImageHeight)}{\tan\left(\frac{FieldofView}{2}\right)}$$

If the field of view of the camera is not known, it can be approximated, with the attendant result that any changes in field of view are only approximations.

Handling Change of Focal Length. The cube size that is computed initially is sufficient so long as the focal length, or zoom, of the camera does not change. On the other hand, in order to handle zoom there should be a way of detecting when the zoom has changed and to take the appropriate actions. A change in zoom can be detected as follows. When the cube is initially created, the focal length was either known or assumed. For each new image that is to be added to the scene model, there is an associated M matrix describing how the new image is to be added to the scene model. M has the focal length embedded within it, but in order to avoid extracting it, the following procedure is used. A point on the left edge of the image is mapped into cube coordinates. Another point on the right edge, and same row as the first point, is also mapped into the cube coordinates. The angle between the two vectors in cube coordinates gives the focal length of the camera for the new image. If the difference is sufficiently large between the original focal length and the new focal length, then a zoom change has been detected. In this situation a completely new resolution layer for the cube is created. However, whereas the first cube was created with the identity matrix for the initial M, the new cube layer will use the most recent M to add the current image to the scene model.

Avoiding Artifacts. If not handled carefully, it is possible to introduce artifacts when reprojecting the scene model or retrieving values from the scene model near cube face edges. In order to avoid artifacts, the last column or row of data where two cube faces meet is stored in both cube faces. This makes the implementation easier, and the additional required storage is minimal.

Minimizing Storage Requirements. In order to reduce the computer resources for implementing a cube scene model, a cube face is allocated only when necessary. Further, only the necessary portions of each cube face are allocated. However, because the entire cube face is not allocated, performance degradation can result when the camera pans or tilts and additional portions of the cube face must be allocated. In order to reduce this degradation, the cube faces are represented as follows. An entire row of column pointers is allocated. If a column is to be allocated, then that entry in the row of column points is set to point to the column data. The size of the column data does not need to be the same as the cube height. When the camera pans and a portion of the cube face must be allocated, the new columns are allocated, and the appropriate column pointer(s) in the row of column pointers is (are) set. This can occur very quickly.

When the camera tilts and a portion of the cube face must be allocated, any new columns that need to be expanded are reallocated, and the existing data is copied into the newly allocated columns. Extending columns will take significantly longer than adding additional columns; however, because panning is much more common than tilting, this generally not a major problem. In order to avoid having to allocate more data every time the camera moves a small amount, additional columns are allocated, and columns of data are made slightly larger than what is immediately required.

Note that the preferred embodiments of the invention are not limited to the use of column pointers and column allocation, as discussed above. Equivalently, row pointers and row allocation could be used in a corresponding fashion. Furthermore, combinations of row and column pointers/allocations could be used.

Representing Non-Used Portions of the Cube Scene Model. Zero is used to represent pixels in the scene model where no data has been added. In areas of the scene model that have not been allocated no special value need be used because it is clear that no value has been placed there. However, in areas that have been allocated but have not yet had data placed there, zero is used to indicate that no data is present. To accommodate this, all pixel values are checked before they are added to the scene model. If an RGB value is (0, 0, 0) then it is changed to (1, 1, 1) before being added to the scene model.

Additional Algorithms. This section describes the procedures for adding an image to the scene model and for retrieving an image patch or point from the scene model.

Algorithm 3: Inserting an image into the scene model

```
Given: M
    Img, the image to be inserted
    A mask indicating which points in Img to insert
    An existing scene model
For each point, p, on the edge of Img
    Map p through M⁻¹ to convert it into scene model
    coordinates
For each cube face that had an edge point of Img mapped to it
{
    Find the bounding box of all points mapped to that
    face from the edge of Img
    For each point, (x, y) within the bounding box just found {
        Map [x, y, FocalLength] through M to convert
        (x, y) to an image coordinate (x', y')
        Using interpolation find the pixel value for (x', y')
        in Img
        // Only points indicated by the mask are used in the
        // interpolation (preferred type: bilinear interpolation)
        Place the pixel value for (x', y') at (x, y)
    }
}
```

Algorithm 4: Reprojecting the scene model to an image

```
Given: M
    Width and height of the image to be created
    A scene model
For each point, (x, y) in Image {
    Map (x, y, focalLength] through M⁻¹ to convert it to a
    vector, V in the cube scene model coordinate system.
    Use the transforms discussed above to convert V to a cube
    face and (x', y') point on the cube face
    Use interpolation to find the pixel value at (x', y')
    // Preferred type of interpolation is bilinear interpolation
    Place the pixel value at (x', y') in the image at (x, y)
}
```

If the intensity or color of a background pixel differs significantly from the value of the corresponding pixel of the background scene model as compared to the variable of that pixel, the pixel is added instead to the set of foreground pixels in the current frame. In this way, inaccuracies in the separation of background from foreground can be detected and removed before they lead to artifacts in the reconstructed video.

Background Matching. According to the present invention, a fifth step 320 (hereinafter referred to as "background matching") is performed following background scene model formation 318 for identifying when a camera is reused in the same location so that the corresponding background scene model can be reused. In many video productions, a small number of cameras in fixed locations are used, and the finished video is the result of splicing together short clips from these cameras. For the purposes of video compression, there is no need to recode and retransmit the backgrounds that are seen repeatedly if their content has not changed significantly.

In the case of a static camera, the background scene model of a shot can be compared to each background scene model previously constructed in a variety of ways. The best matching scene model can be identified using standard correlation or histogram techniques. Reduced resolution or subsampled images can be employed to increase the efficiency of this operation.

The background matching process is a bit more complicated in the case of a moving camera, because the same range of camera angles and focal length values may not have been used. Correlation of a background frame with previously seen background camera angles can be used to identify matching cameras, but such an operation is computationally expensive. Instead, histogram techniques applied to each subset involving a limited range of camera values and zoom factors for each background scene model provide a computationally tractable approximation.

Once a matching background is identified, the existing background scene model can be used and updated, in lieu of creating and coding an additional one. If no matching background scene model is found, it is assumed that a new camera is being employed and creation of a new background scene model is initiated.

Background Video Object Coding. A sixth step 322 (hereinafter referred to as "background video object (i.e., VO) coding 322") is preferably performed following background matching 320 for encoding a background scene model. The encoded background scene model may thereafter be used repeatedly by the decoder to recreate each background of each frame. Rather than performing motion compensation for every scene and coding predictions for every pixel (or block of pixels) of each frame, the present invention stores a single background scene model that can be reused to recreate a background for each frame in a video sequence. The background video object coding step 322 encodes the background scene model so that it can be transmitted once and used repeatedly.

In the case of a static camera, the background scene model is simply a fixed-size image, with the same dimensions as the original video. The background can be encoded using any one of several industry-standard encoding schemes, such as JPEG, JPEG-2000, or the wavelet encoding of sprites defined in MPEG-4.

In the case of a moving camera, the background is represented as a cube scene model, as described above. The cube faces are simple rectangular images that can be encoded in the same fashion as the background scene model in the static camera case.

When variable zoom is present in a sequence, a multi-resolution scene model is employed to maximize the information content retained while economizing the use of storage space. These multi-resolution images may be represented as a pyramid of multi-resolution layers, where each layer is simply an appropriately scaled image. These layers then, are encoded as individual images in the same fashion as the background scene models in the single resolution case.

It is important to note that the added value of the present invention is not dependent upon the particular technique employed for compressing the backgrounds. It is the construction and reuse of background scene models that provides one of the distinct advantages of this invention. As image-encoding techniques improve, the present invention can employ them and continue to provide added value over techniques that do not employ camera motion estimation and background reuse.

Foreground Object Tracking. A seventh step 324 (hereinafter referred to as the "foreground object tracking step 324") is performed just after the foreground/background separation step 316 for grouping pixels representing moving foreground objects in separate objects and for tracking their motion from frame to frame. The foreground/background separation step 316 produces regions of pixels (as previously described) identified as moving foreground objects. Object tracking enables a system to utilize selective compression capabilities of MPEG-4 for individual objects.

A connected components algorithm is preferably employed to group contiguous foreground pixels of a frame into individual regions. Several well-known algorithms may be employed to achieve this result according to the present invention.

Overlap between each region of a frame with a succeeding frame is computed to determine correspondence between corresponding regions from frame to frame. In cases where ambiguity exists and the overlap is not unique, simple correlation (on reduced images) can be used to resolve the ambiguity.

Bounding Box Tracking. An eighth step 326 (hereinafter referred to as "bounding box tracking") is performed after foreground object tracking 324 to circumscribe each foreground region extracted by the foreground object tracking step 324. The foreground regions may not be suitable as input to any of the conventional video compression algorithms because they may have arbitrary shapes that change over time. Bounding box tracking 326 circumscribes each foreground region within a rectangular box, so standard video compression techniques, such as MPEG-2 or MPEG-4 VO-coding, may be employed.

Each foreground region is circumscribed in a fixed size rectangle, which is tracked on a frame to frame basis. Whenever the foreground region grows too large for a fixed size rectangle or becomes significantly smaller, the time duration of the foreground object is ended, and a new foreground object with an appropriately sized rectangle, is initiated. This process results in a collection of foreground objects, all encased in a collection of moving bounding boxes.

In some cases it is necessary to stabilize an image within the bounding box because imprecise extraction of foreground regions may cause the bounding box to jitter about the object. This is easily handled via image stabilization employing reduced resolution image correlation.

Bounding box objects are just the type of input that the standard motion-compensating compression algorithms are designed to handle. They have fixed size, and the image content varies slowly from frame-to-frame, allowing very efficient encoding of each foreground object using standard video compression algorithms.

Foreground Video Object Coding. Preferably, after bounding box tracking 326, a ninth step 328 (hereinafter referred to as "foreground video object coding") is executed to encode and compress the foreground objects. Each foreground object is represented as a rectangular image region with background masks for each frame tracked by the object.

The foreground objects are encoded using standard video object coding techniques, such as MPEG-2 or MPEG-4 VO-coding. Additionally, the bit rate selected to encode each foreground object may be chosen to achieve desired qualities of the reconstructed video.

As in the case of the static image backgrounds, it is important to note that the added value of the invention is not dependent upon the particular technique employed for compressing the video objects. It is the separation and individual encoding of foreground objects that provides one of the distinct advantages of this invention. As video encoding techniques improve, the present invention can employ them and continue to provide value over techniques that do not employ foreground object separation or camera motion estimation.

It is to be understood that the present invention is not limited to the embodiments described above, but encompasses any and all embodiments within the scope of the following claims. Also, steps or features recited above as being required or needed in the practice of one embodiment of the invention may not be required or needed in the practice of another embodiment of the invention.

We claim:

1. A method of generating and utilizing a three-dimensional cube-based scene model from a sequence of video frames, comprising the steps of:

separating background data from foreground data for each of said frames;

using an estimate of relative observer motion, projecting each frame onto a coordinate system used in generating said scene model;

merging the background data of the frame with the scene model;

detecting whether or not a current focal length in a frame has changed relative to a previous focal length of a previous frame, comprising the sub-steps of:

choosing a point on the right edge of a frame;

converting said point to cube coordinates;

choosing a corresponding point on the left edge of said frame, said corresponding point having a row coordinate in common with said point on the right edge of the frame;

converting said corresponding point to cube coordinates;

determining the size of an angle between vectors formed by connecting said points converted to cube coordinates with the origin of said cube coordinates; and if said angle differs from that corresponding to said previous frame in an amount exceeding a particular value, determining that the focal length has changed; and if said detecting step determines that the focal length has changed, creating a new scene model layer corresponding to the current focal length.

2. The method according to claim 1, said step of merging comprising the step of:

updating the scene model by adding data points of said background data of the frame that correspond to data points not already accounted for in the scene model.

3. The method according to claim 1, said step of merging comprising the step of:

updating the scene model by combining those data points of said background data of the frame that differ from corresponding data points of said scene model with said corresponding points of said scene model, said combining comprising at least one of the following methods: averaging, replacing, and blending.

4. The method according to claim 1, further comprising the steps of:

compressing said scene model to obtain compressed scene model data;

combining said compressed scene model data with compressed foreground data to obtain combined compressed data; and transmitting said combined compressed data to a destination.

5. The method according to claim 4, further comprising the steps of:
receiving said combined compressed data at said destination;
separating said combined compressed data into received compressed scene model data and received compressed foreground data;
decompressing said received compressed scene model data to obtain decompressed scene model data;
decompressing said received compressed foreground data to obtain decompressed foreground data; and combining said decompressed scene model data with said decompressed foreground data to reconstruct at least one frame of said sequence of video frames.

6. The method according to claim 1, wherein said scene model is a spherical scene model.

7. The method according to claim 1, wherein said merging step comprises the step of:
storing a row or column of data where two cube faces meet as part of the data associated with both faces.

8. The method according to claim 1, wherein said merging step comprises the step of:
minimizing storage requirements for the scene model.

9. The method according to claim 8, said step of minimizing storage requirements comprising the following sub-steps:
allocating memory only to portions of cube faces that are necessary; and
allocating a row of column pointers.

10. The method according to claim 9, said step of minimizing storage requirements further comprising the sub-step of:
if said observer pans, setting appropriate ones of said column pointers to point to columns of data that need to be allocated as a result of the panning.

11. The method according to claim 9, said step of minimizing storage requirements further comprising the sub-step of:
if said observer tilts, setting appropriate ones of said column pointers to point to columns of data that need to be allocated and extending columns of data as needed.

12. The method according to claim 8, said step of minimizing storage requirements comprising the following sub-steps:
allocating memory only to portions of cube faces that are necessary; and
allocating a column of row pointers.

13. The method according to claim 12, said step of minimizing storage requirements further comprising the sub-step of:
if said observer pans, extending rows of data that need to be extended as a result of the panning.

14. The method according to claim 12, said step of minimizing storage requirements further comprising the sub-step of:
if said observer tilts, setting appropriate ones of said row pointers to point to rows of data that need to be allocated and extending rows of data as needed.

15. A method of generating and utilizing a three-dimensional cube-based scene model from a sequence of video frames, comprising the steps of:
separating background data from foreground data for each of said frames;
using an estimate of relative observer motion, projecting each frame onto a coordinate system used in generating said scene model; and
mapping each point on the edge of a frame, F, through M−1, the inverse of observer motion estimation matrix M, to convert said point to a point in scene model coordinates; and
for each cube face of the scene model to which an edge point of F is mapped, performing the following sub-steps:
finding a box bounding all edge points of F mapped to said cube face; and
for each point, (x,y) within said box, performing the following sub-sub-steps:
mapping a vector defined by (x,y,FL), where FL is a focal length of said observer, through M to convert the vector to an image coordinate (a,b);
using interpolation to determine a pixel value for (a,b) in F; and
placing said pixel value for (a,b) at (x,y).

16. The method according to claim 15, wherein said step of using interpolation comprises the step of using bilinear interpolation to determine a pixel value for (a,b) in F.

17. A method of generating and utilizing a three-dimensional cube-based scene model from a sequence of video frames, comprising the steps of:
separating background data from foreground data for each of said frames; using an estimate of relative observer motion projecting each frame onto a coordinate system used in generating said scene model;
merging the background data of the frame with the scene model;
reprojecting said scene model to an image, comprising the sub-steps of:
for each point (x,y) in said image, performing the sub-sub-steps of:
mapping a vector (x,y,FL), where FL is a focal length of said observer, through M−1, the inverse of an observer motion estimation matrix M, to obtain a vector V in the coordinate system of the cube-based scene model;
transforming V to a point (a,b) on a cube face in the scene model;
using interpolation to find a pixel value at the point (a,b); and
placing the pixel value corresponding to point (a,b) at the point (x,y) in said image.

18. A method according to claim 17, said step of using interpolation comprising the step of using bilinear interpolation to find a pixel value at the point (a,b).

19. A computer-readable medium containing software implementing the method of claim 1.

20. A method of generating and utilizing a three-dimensional scene model from a sequence of video frames, comprising the steps of:
separating background data from foreground data for each of said frame;
using an estimate of relative observer motion, projecting each frame onto a coordinate system used in generating said scene model; and
merging the background data of the frame with the scene model, wherein said scene model is based on a three-dimensional surface;
detecting whether or not a current focal length in a frame has changed relative to a previous focal length of a previous frame, comprising the sub-steps of:

choosing a point on the right edge of a frame;
converting said point to a point in a coordinate system of said three-dimensional surface;
choosing a corresponding point on the left edge of said frame, said corresponding point having a row coordinate in common with said point on the right edge of the frame;
converting said corresponding point to a point in the coordinate system of said three-dimensional surface;
determining the size of an angle between vectors formed by connecting said points converted to points in the coordinate system of said three-dimensional surface with the origin of the coordinate system; and
if said angle differs from that corresponding to said previous frame in an amount exceeding a particular value, determining that the focal length has changed; and if said detecting step determines that the focal length has changed, creating a new scene model layer corresponding to the current focal length.

21. The method according to claim 20, said step of merging further comprising the step of mapping points of an image to points in said scene model using a coordinate transformation corresponding to said three-dimensional surface.

22. The method according to claim 20, further comprising the step of reprojecting said scene model back to an image using a coordinate transformation corresponding to said three-dimensional surface.

23. The method according to claim 20, wherein said merging step comprises the step of:
storing data where two faces comprising said three-dimensional surface meet as part of the data associated with both faces.

24. The method according to claim 20, wherein said merging step comprises the step of:
minimizing storage requirements for the scene model.

25. The method according to claim 20, further comprising the steps of:
compressing said scene model to obtain compressed scene model data;
combining said compressed scene model data with compressed foreground data to obtain combined compressed data; and
storing said combined compressed data on a computer-readable medium.

26. The method according to claim 25, further comprising the steps of:
retrieving said combined compressed data from said computer-readable medium;
separating said combined compressed data into retrieved compressed scene model data and retrieved compressed foreground data;
decompressing said retrieved compressed scene model data to obtain decompressed scene model data;
decompressing said retrieved compressed foreground data to obtain decompressed foreground data; and
combining said decompressed scene model data with said decompressed foreground data to reconstruct at least one frame of said sequence of video frames.

27. A method of compressing and decompressing digital video data obtained from a video source, comprising the steps of:
decomposing said digital video data into an integral sequence of frames obtained from said video source and corresponding to a single observer;
computing a relative position and orientation of said observer based on a plurality of corresponding points from a plurality of frames of said sequence of frames;
classifying motion by said observer;
identifying regions of a video image corresponding to said digital video data containing moving objects and designating such objects as foreground objects;
designating the remaining portions of said video image as background;
encoding said foreground objects separately from said background;
encoding said background by generating a three-dimensional cube-based scene model, comprising the following sub-steps:
using an estimate of observer motion, projecting each frame onto a coordinate system used in generating said scene model; and
merging the portion of said digital video data of said frame corresponding to said background with said scene model;
detecting whether or not a current focal length in a frame has changed relative to a previous focal length of a previous frame, comprising the sub-steps of:
choosing a point on the right edge of a frame;
converting said point to cube coordinates;
choosing a corresponding point on the left edge of said frame, said corresponding point having a row coordinate in common with said point on the right edge of the frame;
converting said corresponding point to cube coordinates;
determining the size of an angle between vectors formed by connecting said points converted to cube coordinates with the origin of said cube coordinates; and
if said angle differs from that corresponding to said previous frame in an amount exceeding a particular value, determining that the focal length has changed; and if said detecting step determines that the focal length has changed, creating a new scene model layer corresponding to the current focal length.

28. The method according to claim 27, said step of merging comprising the step of:
updating the scene model by adding data points of said background data of the frame that correspond to data points not already accounted for in the scene model.

29. The method according to claim 27, said step of merging comprising the step of:
updating the scene model by combining those data points of said background data of the frame that differ from corresponding data points of said scene model with said corresponding points of said scene model, said combining comprising at least one of the following methods: averaging, replacing, and blending.

30. The method according to claim 27, further comprising the steps of:
compressing said scene model to obtain compressed scene model data;
combining said compressed scene model data with compressed foreground data to obtain combined compressed data; and
transmitting said combined compressed data to a destination.

31. The method according to claim 30, further comprising the steps of:

receiving said combined compressed data at said destination;

separating said combined compressed data into received compressed scene model data and received compressed foreground data;

decompressing said received compressed scene model data to obtain decompressed scene model data;

decompressing said received compressed foreground data to obtain decompressed foreground data; and combining said decompressed scene model data with said decompressed foreground data to reconstruct at least one frame of said sequence of video frames.

32. The method according to claim 27, wherein said scene model is a spherical scene model.

33. The method according to claim 27, wherein said merging step comprises the step of:

storing a row or column of data where two cube faces meet as part of the data associated with both faces.

34. The method according to claim 27, wherein said merging step comprises the step of:

minimizing storage requirements for the scene model.

35. The method according to claim 34, said step of minimizing storage requirements comprising the following sub-steps:

allocating memory only to portions of cube faces that are necessary; and allocating a row of column pointers.

36. The method according to claim 35, said step of minimizing storage requirements further comprising the sub-step of:

if said observer pans, setting appropriate ones of said column pointers to point to columns of data that need to be allocated as a result of the panning.

37. The method according to claim 35, said step of minimizing storage requirements further comprising the sub-step of:

if said observer tilts, setting appropriate ones of said column pointers to point to columns of data that need to be allocated and extending columns of data as needed.

38. The method according to claim 35, said step of minimizing storage requirements comprising the following sub-steps:

allocating memory only to portions of cube faces that are necessary; and allocating a column of row pointers.

39. The method according to claim 38, said step of minimizing storage requirements further comprising the sub-step of:

if said observer pans, extending rows of data that need to be extended as a result of the panning.

40. The method according to claim 38, said step of minimizing storage requirements further comprising the sub-step of:

if said observer tilts, setting appropriate ones of said row pointers to point to rows of data that need to be allocated and extending rows of data as needed.

41. A method of compressing and decompressing digital video data obtained from a video source, comprising the steps of:

decomposing said digital video data into an integral sequence of frames obtained from said video source and corresponding to a single observer;

computing a relative position and orientation of said observer based on a plurality of corresponding points from a plurality of frames of said sequence of frames;

classifying motion by said observer;

identifying regions of a video image corresponding to said digital video data containing moving objects and designating such objects as foreground objects;

designating the remaining portions of said video image as background;

encoding said foreground objects separately from said background; and encoding said background by generating a three-dimensional cube-based scene model, comprising the following sub-steps:

using an estimate of observer motion, protecting each frame onto a coordinate system used in generating said scene model; and mapping each point on the edge of a frame, F, through M−1, the inverse of observer motion estimation matrix M, to convert said point to a point in scene model coordinates; and for each cube face of the scene model to which an edge point of F is mapped, performing the following sub-steps:

finding a box bounding all edge points of F mapped to said cube face; and for each point, (x,y) within said box, performing the following sub-sub-steps:

mapping a vector defined by (x,y,FL), where FL is a focal length of said observer, through M to convert the vector to an image coordinate (a,b);

using interpolation to determine a pixel value for (a,b) in F; and placing said pixel value for (a,b) at (x,y).

42. The method according to claim 41, wherein said step of using interpolation comprises the step of using bilinear interpolation to determine a pixel value for (a,b) in F.

43. A method of compressing and decompressing digital video data obtained from a video source, comprising the steps of:

decomposing said digital video data into an integral sequence of frames obtained from said video source and corresponding to a single observer;

computing a relative position and orientation of said observer based on a plurality of corresponding points from a plurality of frames of said sequence of frames;

classifying motion by said observer;

identifying regions of a video image corresponding to said digital video data containing moving objects and designating such objects as foreground objects;

designating the remaining portions of said video image as background;

encoding said foreground objects separately from said background; and encoding said background by generating a three-dimensional cube-based scene model, comprising the following sub-steps:

using an estimate of observer motion, projecting each frame onto a coordinate system used in generating said scene model; and merging the portion of said digital video data of said frame corresponding to said background with said scene model;

reprojecting said scene model to an image, comprising the sub-steps of:

for each point (x,y) in said image, performing the sub-sub-steps of:

mapping a vector (x,y,FL), where FL is a focal length of said observer, through M−1, the inverse of an observer motion estimation matrix M, to obtain a vector V in the coordinate system of the cube-based scene model;

transforming V to a point (a,b) on a cube face in the scene model;

using interpolation to find a pixel value at the point (a,b); and placing the pixel value corresponding to point (a,b) at the point (x,y) in said image.

44. A method according to claim 43, said step of using interpolation comprising the step of using bilinear interpolation to find a pixel value at the point (a,b).

45. A computer-readable medium containing software implementing the method of claim 27.

46. A method of compressing and decompressing digital video data obtained from a video source, comprising the steps of:

decomposing said digital video data into an integral sequence of frames obtained from said video source and corresponding to a single observer;

computing a relative position and orientation of said observer based on a plurality of corresponding points from a plurality of frames of said sequence of frames;

classifying motion by said observer;

identifying regions of a video image corresponding to said digital video data containing moving objects and designating such objects as foreground objects;

designating the remaining portions of said video image as background;

encoding said foreground objects separately from said background;

encoding said background by generating a three-dimensional scene model, comprising the following sub-steps:

using an estimate of observer motion, projecting each frame onto a coordinate system used in generating said scene model; and merging the portion of said digital video data of said frame corresponding to said background with said scene model, wherein said scene model is based on a three-dimensional surface;

detecting whether or not a current focal length in a frame has changed relative to a previous focal length of a previous frame, comprising the sub-steps of:

choosing a point on the right edge of a frame;

converting said point to a point in a coordinate system of said three-dimensional surface;

choosing a corresponding point on the left edge of said frame, said corresponding point having a row coordinate in common with said point on the right edge of the frame;

converting said corresponding point to a point in the coordinate system of said three-dimensional surface;

determining the size of an angle between vectors formed by connecting said points converted to points in the coordinate system of said three-dimensional surface with the origin of the coordinate system; and if said angle differs from that corresponding to said previous frame in an amount exceeding a particular value, determining that the focal length has changed; and if said detecting step determines that the focal length has changed, creating a new scene model layer corresponding to the current focal length.

47. The method according to claim 46, said step of merging further comprising the step of mapping points of an image to points in said scene model using a coordinate transformation corresponding to said three-dimensional surface.

48. The method according to claim 46, further comprising the step of reprojecting said scene model back to an image using a coordinate transformation corresponding to said three-dimensional surface.

49. The method according to claim 46, wherein said merging step comprises the step of:

storing data where two faces comprising said three-dimensional surface meet as part of the data associated with both faces.

50. The method according to claim 46, wherein said merging step comprises the step of:

minimizing storage requirements for the scene model.

51. The method according to claim 46, further comprising the steps of:

compressing said scene model to obtain compressed scene model data;

combining said compressed scene model data with compressed foreground data to obtain combined compressed data; and storing said combined compressed data on a computer-readable medium.

52. The method according to claim 51, further comprising the steps of:

retrieving said combined compressed data from said computer-readable medium;

separating said combined compressed data into retrieved compressed scene model data and retrieved compressed foreground data;

decompressing said retrieved compressed scene model data to obtain decompressed scene model data;

decompressing said retrieved compressed foreground data to obtain decompressed foreground data; and combining said decompressed scene model data with said decompressed foreground data to reconstruct at least one frame of said sequence of video frames.

53. A computer system capable of generating and utilizing a three-dimensional cube-based scene model from a sequence of video frames, comprising:

a computer, including:
  storage means;
  input/output means; and
  processing means; and
software means, programmed on a medium readable by said computer, comprising:
  means for separating background data from foreground data for each of said frames;
  means for projecting each of said frames onto a coordinate system used in generating said scene model, said means for projecting using an estimate of relative motion of an observer;
  means for merging the background data of the frame with the scene model;
means for detecting whether or not a current focal length in a frame has changed relative to a previous focal length of a previous frame, comprising:
  means for choosing a point on the right edge of a frame;
  means for converting said point to cube coordinates;
  means for choosing a corresponding point on the left edge of said frame, said corresponding point having a row coordinate in common with said point on the right edge of the frame;
  means for converting said corresponding point to cube coordinates;
  means for determining the size of an angle between vectors formed by connecting said points converted to cube coordinates with the origin of said cube coordinates; and means for determining that the focal length has changed if said angle differs from that corresponding to said previous frame in an amount exceeding a particular value; and means for creating a new scene model layer corresponding to the current focal length if said means for detecting determines that the focal length has changed.

54. The computer system according to claim 53, said means for merging comprising:

means for updating the scene model by adding data points of said background data of the frame that correspond to data points not already accounted for in the scene model.

55. The computer system according to claim 53, said means for merging comprising:

means for updating the scene model by combining those data points of said background data of the frame that differ from corresponding data points of said scene model with said corresponding points of said scene model, said combining comprising at least one of the following: averaging, replacing, and blending.

56. The computer system according to claim 53, further comprising:

means for compressing said scene model to obtain compressed scene model data;

means for combining said compressed scene model data with compressed foreground data to obtain combined compressed data; and means for transmitting said combined compressed data to a destination.

57. The computer system according to claim 56, further comprising:

means for receiving said combined compressed data at said destination;

means for separating said combined compressed data into received compressed scene model data and received compressed foreground data;

means for decompressing said received compressed scene model data to obtain decompressed scene model data;

means for decompressing said received compressed foreground data to obtain decompressed foreground data; and means for combining said decompressed scene model data with said decompressed foreground data to reconstruct at least one frame of said sequence of video frames.

58. The computer system according to claim 53, wherein said scene model is a spherical scene model.

59. The computer system according to claims 53, wherein said means for merging comprises:

means for storing in said storage means a row or column of data where two cube faces meet as part of the data associated with both faces.

60. The computer system according to claim 53, wherein said means for merging comprises:

means for minimizing storage requirements for the scene model.

61. The computer system according to claim 60, wherein said means for minimizing storage requirements comprises:

means for allocating memory only to portions of cube faces that are necessary;

means for allocating a row of column pointers.

62. The computer system according to claim 61, wherein said means for minimizing storage requirements further comprises:

means for setting appropriate ones of said column pointers to point to columns of data that need to be allocated as a result of any panning by said observer.

63. The computer system according to claim 61, wherein said means for minimizing storage requirements further comprises:

means for setting appropriate ones of said column pointers to point to columns of data that need to be allocated and extending columns of data as needed if said observer tilts.

64. The computer system according to claim 60, wherein said means for minimizing storage requirements comprises:

means for allocating memory only to portions of cube faces that are necessary; and means for allocating a row of column pointers.

65. The computer system according to claim 64, wherein said means for minimizing storage requirements further comprises:

means for extending rows of data that need to be extended if said observer pans.

66. The computer system according to claim 64, wherein said means for minimizing storage requirements further comprises:

means for setting appropriate ones of said row pointers to point to rows of data that need to be allocated and for extending rows of data as needed, if said observer tilts.

67. A computer system capable of generating and utilizing a three-dimensional cube-based scene model from a sequence of video frames, comprising:

a computer, including:
   storage means;
   input/output means; and
   processing means; and software means, programmed on a medium readable by said computer, comprising:

means for separating background data from foreground data for each of said frames;

means for projecting each of said frames onto a coordinate system used in generating said scene model, said means for projecting using an estimate of relative motion of an observer;

means for mapping each point on the edge of a frame, F, through M−1, the inverse of observer motion estimation matrix M, to convert said point to a point in scene model coordinates; and means for processing each cube face of the scene model to which an edge point of F is mapped, comprising:

means for finding a box bounding all edge points of F mapped to said cube face; and means for manipulating each point, (x,y) within said box, comprising:

means for mapping a vector defined by (x,y,FL), where FL is a focal length of said observer, through M to convert the vector to an image coordinate (a,b);

interpolation means for determining a pixel value for (a,b) in F; and means for placing said pixel value for (a,b) at (x,y).

68. The computer system according to claim 67, wherein said interpolation means comprises bilinear interpolation means.

69. A computer system capable of generating and utilizing a three-dimensional cube-based scene model from a sequence of video frames, comprising:
  a computer, including:
    storage means;
    input/output means; and
    processing means; and
  software means, programmed on a medium readable by said computer, comprising:
    means for separating background data from foreground data for each of said frames;
    means for projecting each of said frames onto a coordinate system used in generating said scene model, said means for projecting using an estimate of relative motion of an observer; and
    means for merging the background data of the frame with the scene model,
  said software means further comprising:
    means for reprojecting said scene model to an image, comprising:
      means for processing each point (x,y) in said image, comprising:
        means for mapping a vector (x,y,FL), where FL is a focal length of said observer, through M−1, the inverse of an observer motion estimation matrix M, to obtain a vector V in the coordinate system of the cube-based scene model;
        means for transforming V to a point (a,b) on a cube face in the scene model;
        interpolation means for finding a pixel value at the point (a,b); and
        means for placing the pixel value corresponding to point (a,b) at the point (x,y) in said image.

70. The computer system according to claim 69, wherein said interpolation means comprises bilinear interpolation means.

71. A computer system capable of generating and utilizing a three-dimensional scene model from a sequence of video frames, comprising:
  a computer, including:
    storage means;
    input/output means; and
    processing means; and
  software means, programmed on a medium readable by said computer, comprising:
    means for separating background data from foreground data for each of said frames;
    means for projecting each of said frames onto a coordinate system used in generating said scene model, said means for projecting using an estimate of relative motion of an observer; and
    means for merging the background data of the frame with the scene model, wherein said scene model is based on a three-dimensional surface;
    means for detecting whether or not a current focal length in a frame has changed relative to a previous focal length of a previous frame, comprising:
      means for choosing a point on the right edge of a frame;
      means for converting said point to a point in a coordinate system corresponding to said three-dimensional surface;
      means for choosing a corresponding point on the left edge of said frame, said corresponding point having a row coordinate in common with said point on the right edge of the frame;
      means for converting said corresponding point to a point in the coordinate system corresponding to said three-dimensional surface;
      means for determining the size of an angle between vectors formed by connecting said points converted to points in the coordinate system corresponding to said three-dimensional surface with the origin of the coordinate system corresponding to said three-dimensional surface; and
      means for determining that the focal length has changed if said angle differs from that corresponding to said previous frame in an amount exceeding a particular value; and
    means for creating a new scene model layer corresponding to the current focal length if said means for detecting determines that the focal length has changed.

72. The computer system according to claim 71, said means for merging comprising:
  means for mapping points of an image to points in said scene model using a coordinate transformation corresponding to said three-dimensional surface.

73. The computer system according to claim 71, further comprising: means for reprojecting said scene model back to an image using a coordinate transformation corresponding to said three-dimensional surface.

74. The computer system according to claim 71, wherein said means for merging comprises:
  means for storing in said storage means data where two faces of said three-dimensional surface meet as part of the data associated with both faces.

75. The computer system according to claim 71, wherein said means for merging comprises:
  means for minimizing storage requirements for the scene model.

76. The computer system according to claim 71, further comprising:
  means for compressing said scene model to obtain compressed scene model data;
  means for combining said compressed scene model data with compressed foreground data to obtain combined compressed data; and
  means for storing said combined compressed data in a computer-readable medium.

77. The computer system according to claim 76, further comprising:
  means for retrieving said combined compressed data from said computer-readable medium;
  means for separating said combined compressed data into retrieved compressed scene model data and retrieved compressed foreground data;
  means for decompressing said retrieved compressed scene model data to obtain decompressed scene model data;
  means for decompressing said retrieved compressed foreground data to obtain decompressed foreground data; and
  means for combining said decompressed scene model data with said decompressed foreground data to reconstruct at least one frame of said sequence of video frames.

78. The computer system of claims 71, said software means further comprising:
  means for decomposing a video image into an integral sequence of frames;
  means for computing a relative position and orientation of a single observer generating said video data, based on a plurality of corresponding points taken from a plurality of said frames; and
  means for classifying motion of said observer; and means for encoding said foreground data separately from said background data;

wherein said foreground data corresponds to regions of a video image containing moving objects, and said background data corresponds to remaining regions of a video image.

79. A system for compressing and decompressing digital video data obtained from a video source, the system being connected to a communication network, the system comprising:

the computer system according to claim 71, communicatively connected to said communication network;

at least one viewing system, communicatively connected to said communication network, comprising:
means for decompressing compressed video data; and
means for displaying decompressed video data.

80. The system according to claim 79, further comprising:

a video server, communicatively connected to said communication network, for uploading compressed video data from said computer system and for downloading said compressed video data to said at least one viewing system.

81. The system according to claim 79, wherein compressed video data from said computer system is transmitted directly to said at least one viewing system.

82. The system according to claim 79, wherein compressed video data is stored on a computer-readable medium by said computer system, and said at least one viewing system further comprises means for reading said computer-readable medium.

* * * * *